United States Patent [19]

Freeouf et al.

[11] Patent Number: 5,508,829
[45] Date of Patent: Apr. 16, 1996

[54] LTG ALGAAS NON-LINEAR OPTICAL MATERIAL AND DEVICES FABRICATED THEREFROM

[75] Inventors: John L. Freeouf, Katonah; Rodney T. Hodgson, Ossining; Peter D. Kirchner, Putnam Valley, all of N.Y.; Michael R. Melloch, West Lafayette, Ind.; Jerry M. Woodall, Bedford, N.Y.; David D. Nolte, Lafayette, Ind.

[73] Assignee: International Business Machines Corporation, Armonk, N.Y.

[21] Appl. No.: 264,177

[22] Filed: Jun. 22, 1994

Related U.S. Application Data

[63] Continuation of Ser. No. 993,201, Dec. 18, 1992, abandoned.

[51] Int. Cl.$^6$ .............................. G02F 1/015; G02F 1/35; H01L 31/0232
[52] U.S. Cl. ..................... 359/3; 252/62.3 GA; 257/431; 257/436; 359/7; 359/248
[58] Field of Search ................... 359/3, 7, 248, 359/344, 573; 385/122; 252/62.3 GA; 257/431, 436

[56] References Cited

U.S. PATENT DOCUMENTS

| | | | |
|---|---|---|---|
| 2,692,950 | 10/1954 | Wallace, Jr. | 250/83.3 |
| 3,331,036 | 7/1967 | Colbow | 332/7.51 |
| 3,517,206 | 6/1970 | Oliver | 250/225 |
| 3,518,634 | 6/1970 | Ballman et al. | 340/173 |
| 3,660,818 | 5/1972 | Amodei et al. | 340/173 LS |
| 3,726,585 | 4/1973 | Fedotowsky et al. | 350/160 R |
| 4,115,747 | 9/1978 | Sato et al. | 331/94.5 |
| 4,264,125 | 4/1981 | Shibata | 350/96.14 |
| 4,329,020 | 5/1982 | Dallas et al. | 350/162 SF |
| 4,432,597 | 2/1984 | Bjorklund et al. | 350/3.70 |
| 4,767,195 | 8/1988 | Pepper | 350/354 |
| 4,794,438 | 12/1988 | Levinson et al. | 357/29 |
| 4,816,183 | 3/1989 | Bates, Jr. | 252/501.1 |
| 4,948,212 | 8/1990 | Cheng et al. | 359/560 |
| 5,004,325 | 4/1991 | Glass et al. | 350/354 |
| 5,016,990 | 5/1991 | Dobson | 350/353 |
| 5,059,001 | 10/1991 | Shimizu | 359/24 |
| 5,150,228 | 9/1992 | Liu et al. | 359/7 |
| 5,153,687 | 10/1992 | Ishikawa et al. | 359/248 |
| 5,160,993 | 11/1992 | Ishikawa et al. | 359/248 |
| 5,191,448 | 3/1993 | Vachss et al. | 359/7 |
| 5,216,538 | 6/1993 | Twynam | 359/248 |

FOREIGN PATENT DOCUMENTS 1499304  7/1989  U.S.S.R. .

OTHER PUBLICATIONS

Smith et al., "New MBE Buffer Used to Eliminate Backgating in GaAs MESFET's", IEEE Electron Device Letters, vol. 9, No. 2, Feb. 1988, pp. 77–80.

Melloch et al., "Effect of a GaAs buffer layer grown at low substrate temperatures on a high–electron–mobility modulation–doped two–dimensional electron gas", Appl. Phys. Lett. 54(10), 6 Mar. 1989, pp. 943–945.

(List continued on next page.)

Primary Examiner—Martin Lerner
Attorney, Agent, or Firm—Perman & Green

[57] ABSTRACT

A light responsive device (10) has a body (12) that includes a matrix comprised of Group III–V material, the matrix having inclusions (14) comprised of a Group V material contained therein. The body is responsive to a presence of a light beam that has a spatially varying intensity for modifying in a corresponding spatially varying manner a distribution of trapped photoexcited charge carriers within the body. The distribution of trapped charge carriers induces a corresponding spatial variation in at least one optical property of the Group III–V material, such as the index of refraction of the Group III–V material and/or an absorption coefficient of the Group III–V material. The Group III–V material is comprised of LTG GaAs:As or LTG AlGaAs:As. In an optical storage medium embodiment of the invention the spatial variation in the intensity of the light beam results from a simultaneous application of a first light beam (LB1) and a second light beam (LB2) to the body, and from interference fringes resulting from an intersection of said first and second light beams.

48 Claims, 7 Drawing Sheets

OTHER PUBLICATIONS

Jimenez et al., "Optically Induced reordering of As Cluster Defects in Semiinsulating GaAs", Cryst. Latt. Def. and Amorph. Mat., 1987, vol. 17, pp. 199–204.

Kaminska et al., "Structural properties of As–rich GaAs grown by molecular beam epitaxy at low temperatures", Appl. Phys. Lett. 54(19), 8 May 1989, pp. 1881–1883.

Warren et al., "Arsenic precipitates and the semi–insulating proeprties of GaAs buffer layers grown by low–temperature molecular beam epitaxy", Appl. Phys. Lett. 57(13), Sep. 24, 1990, pp. 1331–1333.

Melloch et al. "Formation of arsenic precipitates in GaAs buffer layers grown by molecular beam epitaxy at low substrate temperatures", Appl. Phys. Lett. 57(15), Oct. 8, 1990, pp. 1531–1533.

Knox et al., "Low–temperature–grown GaAs quantum wells: Femtosecond nonlinear optical and parallel–field transport studies", Appl. Phys. Lett. 59(12), Sep. 16, 1991, pp. 1491–1493.

Johnson et al., "Stratified volume holographic optical elements", Optics Letters, vol. 13, No. 3, Mar. 1988, pp. 189–191.

Stern et al., "Photon Recycling In Semiconductor Lasers", Journal of Applied Physics, vol. 45, No. 9, Sep. 1974, pp. 3904–3906.

Pepper, "Nonlinear Optical Phase Conjugation", Optical Engineering, Mar./Apr. 1982, vol. 21, No. 2, pp. 156–182.

Bashaw et al., "Introduction, revelation, and evolution of complementary gratings in photorefractive bismuth silicon oxide", Physical Review B, Sep. 15, 1990, vol. 42, No. 9, pp. 5641–5648.

Dube et al., "The Photorefractive Effect in Doped Bismuth Silicon Oxide Crystals", SPIE, vol. 1127, Nonlinear Optical Materials II (1989) pp. 195–204.

Baraff et al., "Bistability and Metastability of the Gallium Vacancy in GaAs: The ACtuator of EL2?", Physical Review Letters, vol. 55, No. 21, 18 Nov. 1985, pp. 2340–2343.

Fathauer et al., "Infrared response from metallic particles embedded in a single–crystal Si matrix: The layered internal photoemission sensor", Appl. Phys. Lett. 57(14), Oct. 1, 1990, pp. 1419–1421.

Baranowski et al., "Evidence for Superconductivity in Low––Temperature–Grown GaAs", Physical Review Letters, vol. 66, No. 23, 10 Jun. 1991, pp. 3079–3082.

D. D. Nolte, "Resonant photodiffractive effect in semi–insulating multiple quantum wells", J. Opt. Soc. Am. B, vol. 7, No. 11, Nov. 1990, pp. 2217–2225.

LTG ALGAAS NON-LINEAR OPTICAL MATERIAL AND DEVICES FABRICATED THEREFROM

This is a continuation of application Ser. No. 07/993,201 filed on Dec. 18, 1992 now abandoned.

FIELD OF THE INVENTION

This invention relates generally to optically responsive composite materials and devices and, in particular, to an optically responsive material comprised of Low Temperature Grown (LTG) AlGaAs and GaAs.

BACKGROUND OF THE INVENTION

Electro-optic modulators are used for, by example, optical fiber communications, free-space interconnects, spatial light modulators, and optical computers. Typical electro-optic modulators require a large percentage of modulation of the optical fields with small driving voltages and currents. The largest electro-optic effect in semiconductor materials is the quadratic electroabsorption for interband transitions. In bulk semiconductors, at room temperature, the interband excitonic transition is broadened by phonon interactions, thereby reducing the maximum electro-optic effects. Room-temperature semiconductor modulators have thus typically relied on the enhancement of transition strengths and the reduction of broadening of quantum-confined excitons within multiple quantum well structures.

The following U.S. Patents are illustrative of various types of optical devices, including modulators: U.S. Pat. No. 2,692,950, "Valve for Infrared Energy"; U.S. Pat. No. 3,331,036, "Optical Wave Modulators and Attentuators"; U.S. Pat. No. 3,726,585, "Electrically Modulated Radiation Filters"; U.S. Pat. No. 4,115,747, "Optical Modulator Using a Controllable Diffraction Grating"; and U.S. Pat. No. 4,264,125, "Transmissive Surface Layer Effect Electro-Optic Device for use in Optical Modulators and the Like".

In U.S. Pat. No. 4,767,195, "System and Method for Encoding Information Onto an Optical Beam", D. M. Pepper describes the use of photorefractive material, such as GaAs and $BaTiO_3$, in the construction of a phase conjugating mirror (PCM). In this regard reference is also made to a paper authored by D. M. Pepper entitled "Nonlinear optical phase conjugation", Optical Engineering, March/April 1982, Vol. 21, No. 2, pp. 156–183.

In U.S. Pat. No. 5,016,990, "Method of Modulating an Optical Beam", P. J. Dobson describes the use of an etalon having a quantum size effect confinement region for electrons and holes. The quantum size effect confinement region is comprised of a GaAs/AlGaAs superlattice or a multiple-quantum well structure. The use of quantum wires or quantum dots, in place of a quantum well structure, to form the quantum size effect confinement region is mentioned in column 8. The etalon is used to amplitude modulate an optical beam in accordance with a control optical beam.

As indicated in the foregoing U.S. Patent, efforts to improve electro-optic properties have been directed towards reducing the dimensionality of the excitons by bandgap engineering. Optically responsive media is one important application that benefits from a reduction in the exciton dimensionality. As an example, D. D. Nolte, D. H. Olson, G. E. Doran, W. H., Knox, and A. M. Glass describe, in an article entitled: Resonant photodiffractive effect in semi-insulating multiple quantum wells, J. Opt. Soc. Am. B, Vol. 7, No. 11, November 1990, pages 2217–2225, the use of semi-insulating multiple quantum wells to combine the holographic properties of the photorefractive effect with the large resonant optical nonlinearities of quantum-confined excitons. GaAs—AlGaAs multiple-quantum-well structures are made semi-insulating by proton implantation. The implant damage produces defects that are available to trap and store charge during transient holographic recording using coherent optical excitation. The application of these devices to image processing is demonstrated by the use of the Franz-Keldysh effect in four-wave mixing at wavelengths near 830 nm.

The following U.S. Patents are exemplary of various optical systems: U.S. Pat. No. 3,517,206, "Apparatus and Method for Optical Read-out of Internal Electrical Field"; U.S. Pat. No. 3,518,634, "Optical Memory with Photoactive Memory Element", U.S. Pat. No. 4,329,020, "Method of Manufacturing Inverse Filters by Holographic Techniques"; and U.S. Pat. No. 4,432,597, "Transmissive Holographic Optical Element on Aberatting Substrate".

In U.S. Pat. No. 3,660,818, "Electro-Optic Memory" J. J. Amodei and R. Williams describe the use of donor-doped large bandgap material, such as GaAs, having a compensator acceptor diffused into a surface. The compensator centers neutralize the effect of the donor impurities by trapping the free electrons contributed by the donor atoms. The effect is said to return the material to intrinsic values of resistivity.

All such optical storage media have one basic requirement: a permanent or semi-permanent optically induced change in the optical properties of the media. Many types of materials and processes satisfy this requirement.

As an example, the above-mentioned photorefractive materials can be employed to form optical storage media. In the photorefractive effect, photoinduced carriers drift or diffuse from a photoexcited region and are trapped at defects. The resulting trapped space-charge electric fields alter the refractive index of the materials through the electro-optic effect. The photorefractive effect relies on holographic techniques that produce interference fringes in the material.

A closely related phenomenon is the photodiffractive effect. In the photodiffractive effect, the trapped space-charge field pattern alters both the index of refraction and also the radiation absorption coefficient of the media, in addition to the refractive index. The photodiffractive effect is the general effect of diffraction from a refractive index grating or an absorption grating.

One important consideration in realizing a high storage density holographic optical media is the spatial resolution of the media material, defined by a minimum interference fringe spacing. The storage time of the information into the media material is another important consideration.

Reference is made to U.S. Pat. No. 5,004,325, "Optical Processing Using a Multilayer Heterostructure", to A. M. Glass, W. H. Knox, and D. D. Nolte. This patent describes a multi-layered, multiple quantum well (MQW) electro-optic medium wherein deep levels are formed by proton implantation. The deep levels function to localize photocarriers. Deep levels are also said to be created by implanting oxygen atoms, neutron exposure, or by doping the heterostructure with certain impurities. For GaAs, chromium is said to be a suitable dopant for creating deep levels.

Heretofore, most electrooptic/photodiffractive storage materials are characterized as single phase materials having uncontrolled defect densities and properties. The single phase material absorbs light and generates photoexcited carriers such as electrons and holes. The charge carriers diffuse away from a region of high light intensity, or are driven away by an externally applied electric field, and are trapped at defects in the material. However, in that the defect states are difficult to control in density, and generally have a multiplicity of energy levels, the carriers trapped at such defects have uncontrolled lifetimes.

Low temperature grown (LTG) molecular beam epitaxy (MBE) GaAs has been suggested for use as a buffer layer for electrical isolation of integrated circuits, as a material in ultra-fast switches, and as a material for constructing long-wavelength radiation detectors. As an example of the first application, reference is made to an article by F. W. Smith, A. R. Calawa, Chang-Lee Chen, M. J. Manfra, and L. J. Mahoney, "New MBE Buffer Used to Eliminate Backgating in GaAs MESFET's", IEEE Electron Device Letters, Vol. 9, No. 2, 2/88, pp. 77–80, and an article by M. R. Melloch, D. C. Miller, and B. Das, "Effect of a GaAs buffer layer grown at low temperatures on a high-electron-mobility modulation-doped two-dimensional electron gas" Appl. Phys Lett. 54(10), 6 Mar. 1989, pp. 943–945.

Commonly assigned U.S. patent application Ser. No. 07/715,757, filed Jun. 14, 1991, "Compound Semiconductor Having Metallic Inclusions and Devices Fabricated Therefrom" by J. Burroughes, R. R. Hodgson, D. T. McInturff, M. R. Melloch, N. Otsuka, P. M. Solomon, A. C Warren, and J. N. Woodall (abandoned in favor of Ser. No. 08/104,423, filed Aug. 9, 1993 (allowed)) describes the use of LTG GaAs:As in constructing radiation detectors, such as PIN diodes. It is shown that the As precipitates can absorb light of less than bandgap energy, and that the GaAs:As material can be employed as a photodetector for sub-bandgap light. The LTG GaAs material is grown by MBE techniques at relatively low substrate temperatures (200° C.), resulting in approximately one percent of excess arsenic being incorporated into the GaAs material. During post-growth annealing, the excess arsenic has been found to precipitate into clusters, forming GaAs:As.

The following articles are referenced for describing the fabrication and physical properties of LTG GaAs:

Optically Induced Reordering of As Cluster Defects In Semi-insulating GaAs, by J. Jimenez, P. Hernandez, M. A. Gonzalez, L. F. Sanz, and J. A. De Saja, Cryst. Latt. Def. and Amorph. Mat., Vol. 17, 1987 pp. 199–204;

Structural Properties of As-rich GaAs Grown by Molecular Beam Epitaxy at Low Temperatures, by M. Kaminska, Z. Liliental-Weber, E. R. Weber, T. George, J. B. Kortright, F. W. Smith, B-Y. Tsaur, and A. R. Calawa, Appl. Phys. Lett. 54 (19), pp. 1881–1883, 8 May 1989;

Arsenic Precipitates and the Semi-insulating Properties of GaAs Buffer Layers Grown by Low-temperature Molecular Beam Epitaxy, by A. C. Warren, J. M. Woodall, J. L. Freeouf, D. Grischkowsky, D. T. McInturff, M. R. Melloch, and N. Otsuka, Appl. Phys. Lett. 57(13), pp. 1331–1333, 24 Sep. 1990; and Formation of Arsenic Precipitates in GaAs Buffer Layers Grown by Molecular Beam Epitaxy at Low Substrate Temperatures, by M. R. Melloch, N. Otsuka, J. M. Woodall, A. C. Warren, and J. L. Freeouf, Appl. Phys. Lett. 57(15), pp. 1531–1533, 8 Oct. 1990.

Reference is also made to an article entitled "Low-temperature-grown GaAs quantum wells: Femtosecond non-linear optical and parallel-field transport studies", by W. H. Knox, G. E. Doran, M. Asom, G. Livescu, R. Leibenguth, and S.N.G. Chu, Appl. Phys. Lett. 59(12), pp. 1491–1493, 16 Sep. 1991. These authors report a broadening of the exciton absorption by the presence of excess arsenic defects within a LTG structure having 75 periods of 6.0 nm GaAs wells and 3.0 nm barriers. The sample was mounted on a glass substrate and the back etched away by a selective chemical etching.

What is not disclosed by the foregoing U.S. Patents and journal articles, and what is thus an object of this invention to provide, is a non-linear heterogeneous optical material that is particularly useful as a high density optical storage medium; the heterogeneous material being comprised of a Group III–V material having Group V precipitates contained therein. The material may also be comprised of, by example, Ge having Ni precipitates.

A further, related object of this invention is to provide a non-linear heterogeneous optical material that is particularly useful as a high density optical storage medium; the heterogeneous material being comprised of a Group III–V material having Group V precipitates contained therein; wherein the precipitates confine the wavefunctions of electrons and holes, resulting in an "exciton in a cage" effect for excitons within the Group III–V material between the Group V precipitates.

Another object of this invention is to provide an optically responsive heterogeneous material having a plurality of phases, wherein at least one phase absorbs light and generates photoexcited carriers, at least one phase captures the photoexcited carriers, and at least one phase is a dielectric phase having optical constants which are a function of a local electric field.

Another object of this invention is to provide an optical storage medium that overcomes the problems of the prior art, that exhibits a high optical storage density, and that operates with low optical power.

Another object of this invention is to provide an optical storage medium that is comprised of a Group III–V material and that does not require the growth of multiple quantum wells, thereby providing lower cost and reduced fabrication complexity.

A further object of this invention is to provide an optical storage medium that is comprised of a Group III–V heterogeneous material having Group V precipitates contained therein, the precipitates function to confine excitons within a "cage" of precipitates.

A further object of this invention provides an information storage and retrieval system that includes an optical storage medium that is comprised of a Group III–V heterogeneous material having Group V precipitates contained therein.

Another object of this invention is to provide an optically responsive material that exhibits photorefractive gain.

SUMMARY OF THE INVENTION

The foregoing problems are overcome and the objects of the invention are realized by a light responsive device having a body that includes a semiconductor material that exhibits an excitonic transition, the semiconductor material containing metallic inclusions. In an exemplary embodiment of the invention, the light responsive device includes a matrix comprised of a Group III–V material, the matrix having inclusions comprised of a Group V material contained therein. The body is responsive to a presence of a light beam that has a spatially varying intensity for modifying in a corresponding spatially varying manner a distribution of photoexcited charge carriers within the body. The photoexcited charge carriers are trapped locally by the Group V inclusions, thereby inducing a corresponding spatial variation in at least one optical property of the Group III–V material. The at least one optical property is an index of refraction of the Group III–V material and/or an absorption coefficient of the Group III–V material.

In an optical storage medium embodiment of the invention, and also in an information storage and retrieval system embodiment of the invention, the spatial variation in the intensity of the light beam results from a simultaneous application of a first light beam and a second light beam to the body, and from interference fringes resulting from an intersection of said first and second light beams. An embodiment of the invention that is shown to provide photorefractive gain, wherein there is a non-reciprocal energy transfer from one laser beam to another. If the photorefractive gain exceeds the absorption, then there is net optical amplification.

In one embodiment of the invention, the Group III–V material matrix and Group V inclusions are comprised of LTG GaAs:As or LTG AlGaAs:As. In other embodiments of the invention the inclusions are comprised of Al or Cr. In a further embodiment of the invention the matrix is comprised of Ge and the inclusions are comprised of Ni.

In accordance with a method of storing a pattern within an optical storage medium, the following steps are executed: (a) providing an optical storage medium that includes a matrix comprised of Group III–V material having inclusions comprised of a Group V material contained therein; (b) illuminating the medium with light having a spatially varying intensity profile characterized by alternating bright and dark fringes; (c) within a bright fringe, ejecting photoexcited charge carriers into the matrix; (d) within a dark fringe, trapping photoexcited charge carriers with the inclusions; and (e) responsive to a spatial distribution of an electric field resulting from a redistribution of charge carriers between the bright and dark fringes, inducing a corresponding spatial variation in at least one optical property of the Group III–V material.

An electric field applied across the medium causes a spatial shift of charge carriers within the medium. The electric field may be provided by external electrodes, by an intrinsic field resulting from a compositional grading of the Group III–V material during growth, or by a combination of external electrodes and an intrinsic field.

This invention also teaches a volume holographic medium, and a method of fabricating same. The method includes the steps of: (a) providing a substrate; and (c) depositing a multilayered structure over a surface of the substrate, the multilayered structure including a plurality of LTG Group III–V layers individual ones of which are interposed between two buffer layers. Each of the LTG Group III–V layers forms a portion of the volume holographic medium.

It is shown that the distribution of charge can occur from bright fringe regions to dark fringe regions, or from gray fringe regions to gray fringe regions. In the first case (bright fringes to dark fringes) there is a spatial shift of the optical charges relative to the light intensity fringes. This spatial shift is referred to as a photorefractive phase shift and is the origin of optical gain. If the photorefractive gain exceeds the absorption, then there is net optical amplification. In the case of the charge distributing between gray fringe regions, there occurs a screening of applied electric fields without a phase shift.

BRIEF DESCRIPTION OF THE DRAWINGS

These and other features of the invention will be made more apparent in the ensuing Detailed Description of the Invention, when read in conjunction with the attached Drawings, wherein.

DETAILED DESCRIPTION OF THE INVENTION

Figure 1A:
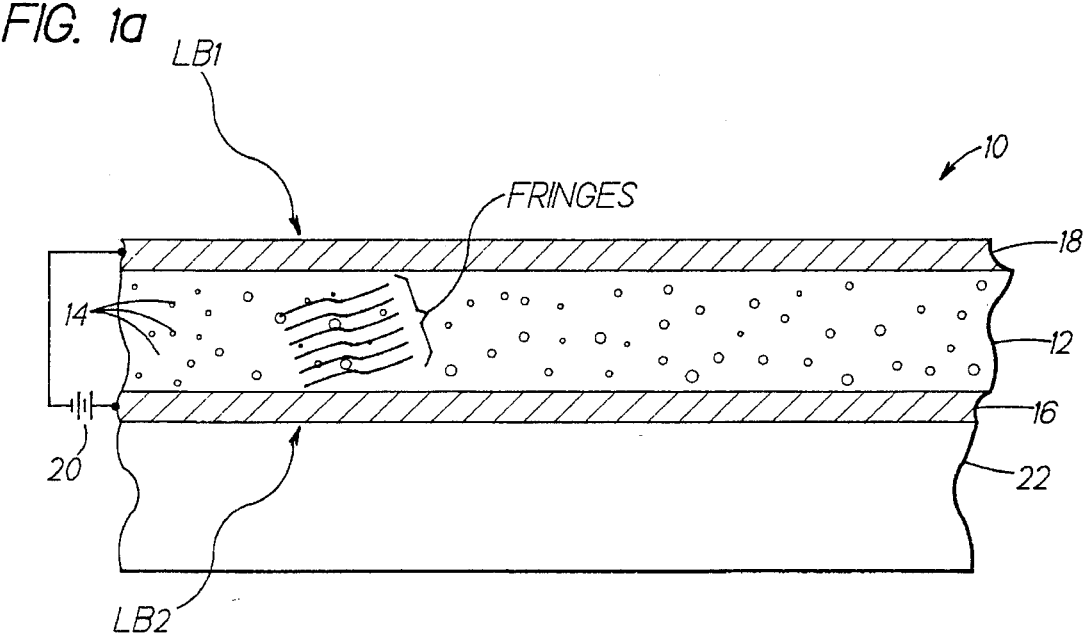
FIG. 1a and 1b are each a cross-sectional view, not to scale, of an optical storage medium that is constructed and operated in accordance with the invention.
Figure 1B:
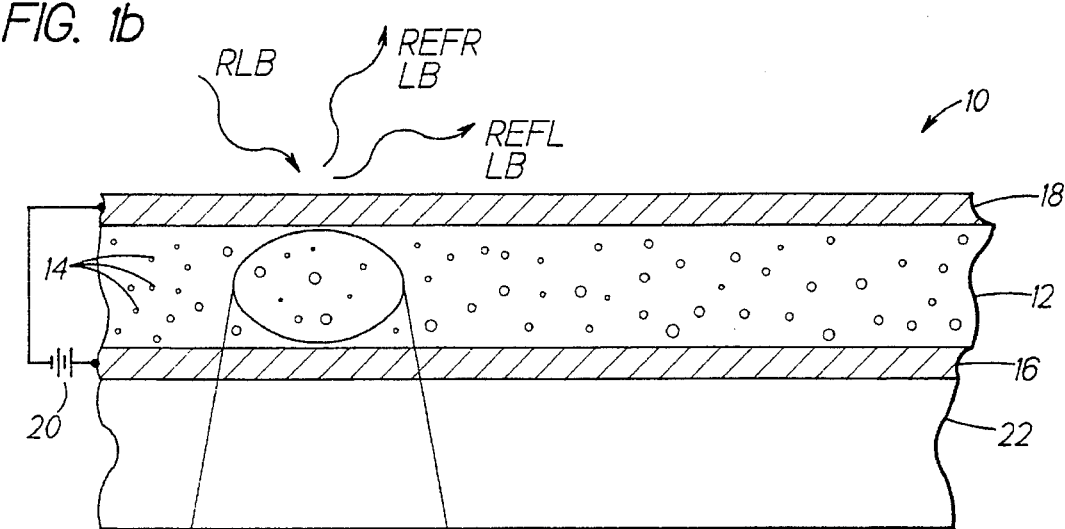
Figure 1C:
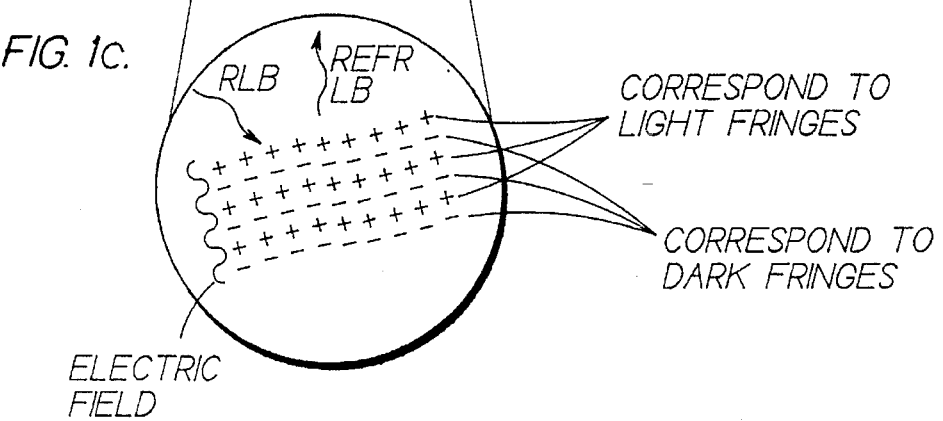
FIG. 1c is an enlarged view of a portion of FIG. 1b.

Reference is made to FIGS. 1a, 1b and 1c for showing a cross-sectional view, not to scale, of an optical storage medium 10 that is constructed and operated in accordance with this invention. A body 12 has an optically active region that is comprised of a heterogeneous region of GaAs:As, the As inclusions or precipitates 14 being generally indicated as the dots that are uniformly distributed throughout a surrounding GaAs matrix.

Figure 13:
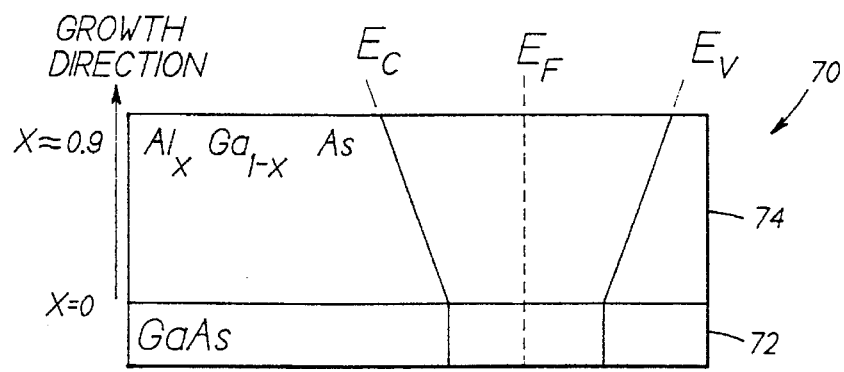
FIG. 13 illustrates a cross-section, not to scale, of an embodiment of the invention wherein the LTG Group III–V material is compositionally graded so as to provide an intrinsic bias electric field, thereby eliminating or reducing a requirement to provide external bias electrodes and potentials.

As employed herein, the term "heterogeneous" is intended to mean that the composition of the body 12 is substantially uniform throughout the volume of the optically active region, as opposed to the varying composition found in a multilayered structure, such as a structure that includes multiple quantum wells. The compositionally graded embodiment of the invention that is described below with respect to FIG. 13 is also considered herein to be a heterogeneous structure.

Figure 9:
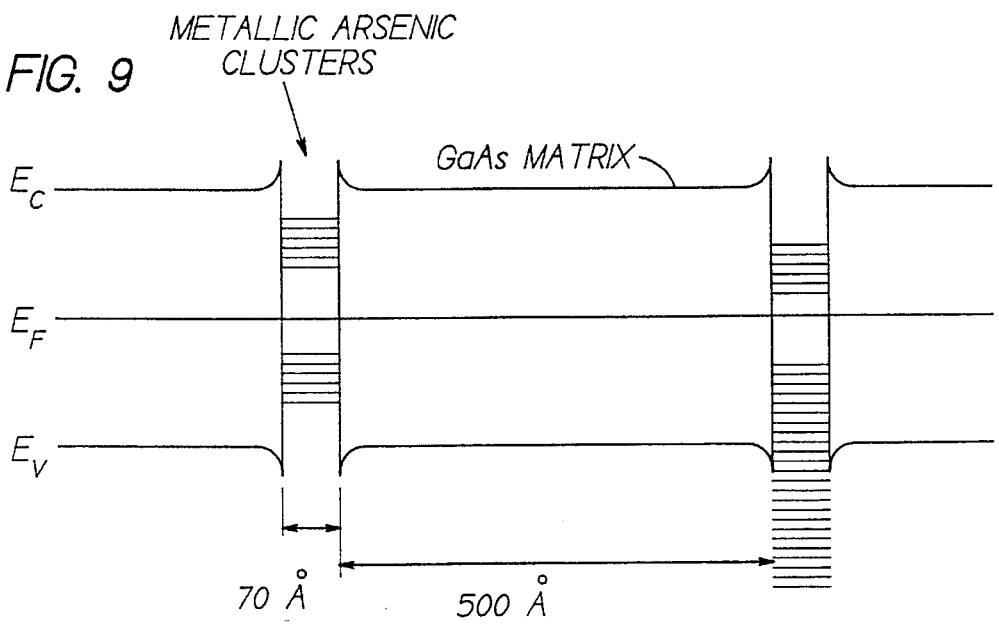
FIG. 9 is diagram showing the energy band structure for LTG GaAs:As material.

FIG. 9 is a diagram showing the energy band structure for LTG GaAs:As material having, by example, metallic As precipitates with a diameter of 70 Angstroms and spaced 500 Angstroms apart.

In this embodiment of the invention the GaAs:As body 12 has first and second transparent electrodes 16 and 18 disposed on opposite major surfaces thereof, the electrodes 16 and 18 being connected during use to a source of voltage potential, schematically illustrated as a battery 20. One suitable material for the electrodes 16 and 18 is Indium Tin Oxide, although a thin layer of gold or other conductive, and preferably transparent, material may also be employed. The voltage potential between electrodes 16 and 18 sets up an electric field within the GaAs:As, the electric field being perpendicular to the major surfaces. Due to a preferred thickness of the body 12 of approximately one to two micrometers, a substrate 22 is employed to provide mechanical support. The substrate 22 is preferably comprised of a material that is substantially transparent at the wavelength or wavelengths of interest. If desired, an anti-reflection (AR) coating can be applied to reduce the reflections of incident light beams.

In accordance with this invention it has been found that the GaAs:As material 12, when exposed to a spatially varying pattern of light of above bandgap or sub-bandgap energy, traps charge carriers on the precipitates in a spatial pattern determined by the pattern of the light. When the precipitates 14 are charged in this manner, a local electric field is set up in the surrounding GaAs matrix. The local electric field changes the optical constants or properties of the GaAs, in particular the absorption coefficient and the index of refraction. As a result, the change in optical properties of the GaAs provides a "memory" of the spatial properties of the original light field. Thus, the effect of one light field can be employed to influence either itself or another light field. This memory is time dependent, is initiated shortly after the first light field is applied, and persists for a period of time after the first light field is removed.

For example, FIG. 1a shows a first light beam (LB1) and a second light beam (LB2) that intersect within the GaAs:As material 12. The wavelength of the light and the thickness of the material 12 are selected such that there is little absorption during one pass through the GaAs:As. The two light beams set up a standing wave of high and low light intensity, the standing waves corresponding to the interference fringes resulting from constructive and destructive interference of LB1 with LB2. Preferably, intelligence or information is spatially encoded within one of the beams, typically LB2. As such, the spatial pattern of the generated standing waves (interference fringes) also encodes the information.

It is assumed for this particular description that electrons are liberated from the As precipitates 14 within the regions of high light intensity (a bright fringe). Carriers may also be generated by photoabsorption by the GaAs matrix, thus producing electron hole pairs in the light regions. The liberated electrons drift under the influence of the electric field applied between electrodes 16 and 18. When an electron drifts into a region of low light intensity (a dark fringe), the electron is trapped there by one of the As precipitates 14. A "gray" fringe is considered to be a boundary region between a bright fringe and a dark fringe.

Figure 11A:
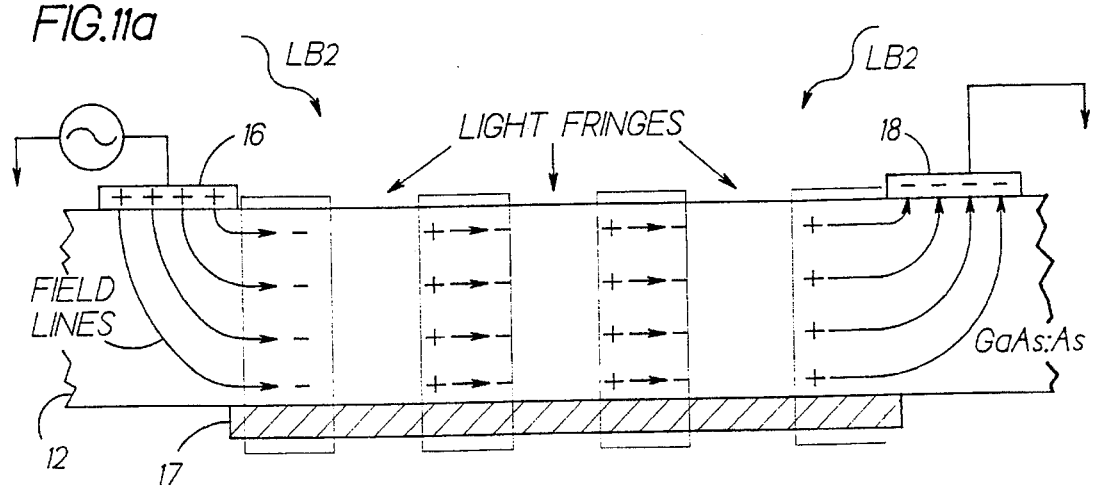
FIG. 11a is a cross-sectional view, not to scale, of a top electrode, reflection-mode embodiment of the invention showing internal electric field lines and a distribution of photogenerated charge carriers.
Figure 11B:
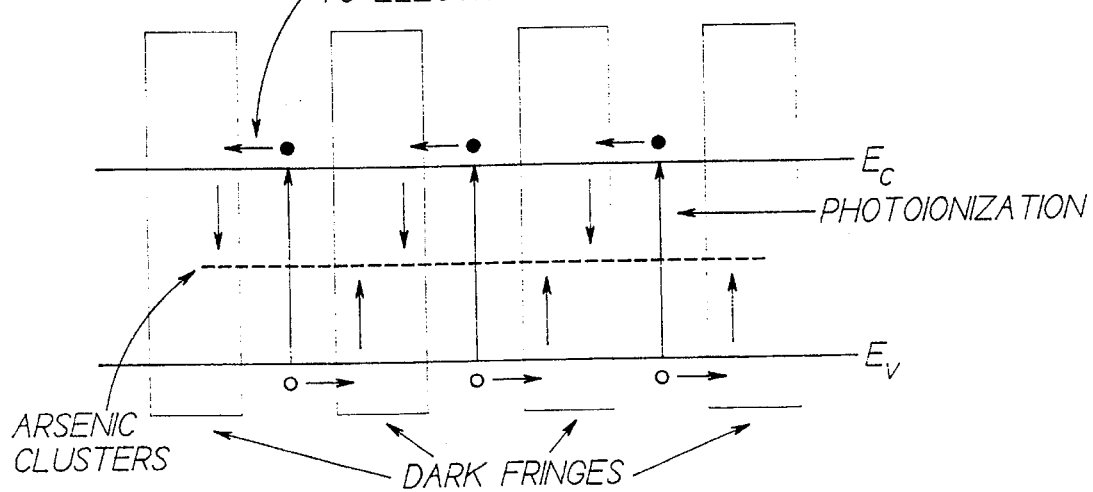
FIG. 11b illustrates a charge carrier transport mechanism within the device of FIG. 11b.

As is seen in the enlarged portion of FIG. 1b (i.e., FIG. 1c), and also in FIG. 11b, this results in a net positive charge occurring in a region of, for example, high light intensity, and a corresponding net negative charge accumulating in a region of low light intensity. As was described above, this accumulation of charge causes a local electric field to be established between the dark and light fringes. When the externally applied electric field is removed, the charges and the local electric field remain in place for a duration that is a function of the resistivity of the GaAs:As material 12.

The stored information may be retained by reading out the information before the internal electric fields dissipate, and by writing the information back into the device, thus "refreshing" the stored information. By example, for AlGaAs:As material maintained near room temperature (25° C.) refresh rates of 10 Hz are suitable.

The embodiment of FIG. 11a provides the transparent electrodes 16 and 18 on the same surface. For this embodiment, a reflective layer 17 may also be employed, with the light beams LB1 and LB2 incident on the same surface. The thickness of the GaAs:As layer 12 is selected or tuned as a function of wavelength to provide an interference device that operates in a reflective, as opposed to an absorptive, mode. This provides for an increase in efficiency over that of an absorptive device, and contrast ratios of the order of $10^2$ are obtainable.

As was noted above, the optical constants of the GaAs material are functions of the electric field. Due to the spatial distribution of charge within the GaAs, the index of refraction also has a spatially varying component. Light entering the body 12 experiences the spatially varying index of refraction, and is scattered as if the GaAs material operated as a diffraction grating. If a second light beam of the same frequency and direction as one of the original beams (LB1 or LB2) impinges on the material, such as the Read-out Light Beam (RLB) of FIG. 1b, the light is diffracted to reproduce the characteristics of the second beam in the well-known holographic reconstruction. In FIG. 1b the refracted light beam is designated REFR LB, while a normally reflected light beam is designated REFL LB.

Light having a different frequency and direction than either LB1 or LB2 can be employed to detect the spatially varying index of refraction, although the diffracted light will exit with a different, but calculable, direction. Also, light having a photon energy that is insufficient to release carriers from the As inclusions 14 can be employed for the RLB. This has the advantage of not erasing or altering the pattern stored within the medium 10.

The technique described above employs a single frequency of light to write the hologram into the GaAs:As material 12; that is, LB1 and LB2 are identical in wavelength and may be derived from a common source. The writing density is determined by the fringe spacing, or the wavelength of the writing light in this case. By example, if the writing light has a wavelength of one micrometer, the corresponding writing density is $10^8$ cm$^{-2}$. This density can be multiplied by using multiple writing beams of different wavelengths to yield a superposition hologram. In that the spatial resolution of the local electric field is on the order of 1000 Angstroms, a one micrometer thick film of the GaAs:As material 12 will, in principle, store in excess of $10^{10}$ bits/cm$^2$.

In holographic storage media, the beams are not focussed down. Instead, the image is distributed throughout the storage medium. The data density is set by the highest spatial frequency K=$2\pi/\Lambda$ that the material can support. As an approximation, there is 1 bit/$\Lambda_c^2$, where $\Lambda_c$ is the cut-off fringe spacing.

In the foregoing description, the change of the index of refraction is used to store the information. However, other parameters also change as a function of the local electric field strength, such as the optical absorption, and can also be used to read information stored in the GaAs:As material.

The teaching of the invention is now described in greater detail with reference to the ensuing two examples.

EXAMPLE 1

LTG GaAs samples were grown using a Varian Gen-II molecular beam epitaxy system. The device structure included a 100 nanometer layer of AlAs over a semi-insulating GaAs substrate. A 1.45 micrometer thick LTG layer was grown over the AlAs layer at a growth temperature of 250° C. Following growth, the sample was annealed at 600° C. for one hour. For these conditions, the arsenic precipitate density is found to be approximately $10^{17}$ cm$^{-3}$, and the average precipitate size is five nanometers. Following the anneal, the LTG layer was removed from the substrate using a lift-off etch that selectively etches the AlAs layer and allows the LTG layer to float free of the substrate. One suitable technique for performing this lift-off procedure is described in an article entitled "Photon recycling in semiconductor lasers", J. Appl. Phys., Vol. 45, No. 9, 9/74, by Frank Stern and J. M. Woodall.

The free standing LTG layer was bonded to a sapphire disc using van der Waals bonding. Two gold strips separated by one millimeter were evaporated onto the top surface of the sample, and electrodes were attached with silver paint.

The conductivity and photoconductivity of the sample were investigated after the contacts were deposited. The sample was found to exhibit unusual I–V characteristics. Up to 1000 Volts was applied across the one millimeter spacing between the gold electrodes. For voltages less than 200 V, the I–V characteristic was approximately linear with a resistance (R) of approximately $10^{10}$ ohms. In the dark, the sample exhibited an asymmetric I–V relation with rectification. The dark currents were found to saturate to constant values for voltages greater than 500 V.

Figure 8:
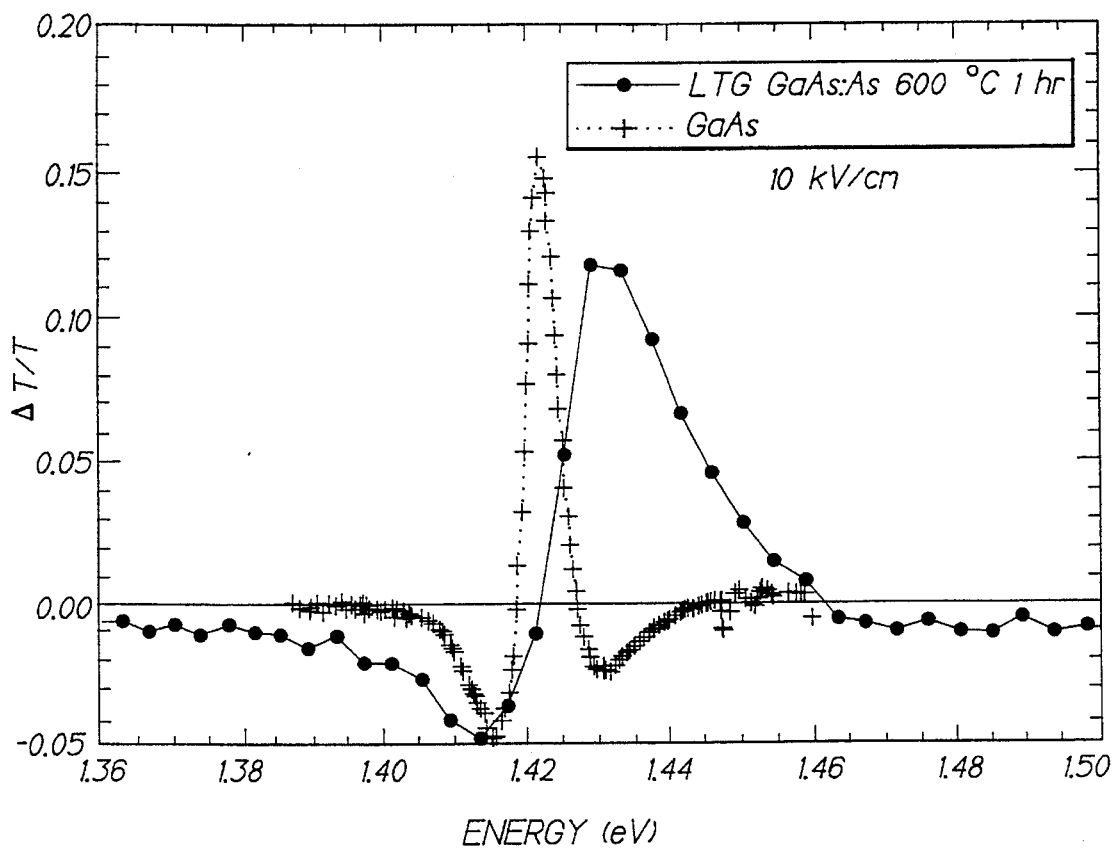
FIG. 8 is a graph that illustrates the broadening of the exciton peak for a LTG GaAs:As sample as compared to a conventional GaAs sample.

The interband transition electroabsorption properties of the material were found to be surprisingly large. As seen in FIG. 8, the width of the exciton transition in the LTG material was approximately 30 meV, significantly larger than the exciton width in ordinary MBE GaAs. However, the relative change in the absorption for photon energies tuned close to the bandgap was approximately 10% for a field of $10^4$ V/cm, which is comparable with the effect in ordinary GaAs. Therefore, the inhomogeneous broadening of the exciton transition linewidth must be accompanied by an increase in electro-optic properties for the transition, in order to account for the large room-temperature electroabsorption properties that are useful for holographic techniques. The electro-optic effect is approximately quadratic below 300 V.

To characterize the holographic optical storage properties of the GaAs:As sample material, both two-wave and four-wave mixing experiments were performed upon the samples. The mixing experiments were performed using a Ti:Sapphire laser that was tuned to the peak in the electroabsorption at hv$^-$=1.434 eV. Two coherent laser beams were crossed inside the sample, producing interference fringes. In this case, carriers were ejected from the GaAs matrix, as well as from the As inclusions. The electrons and holes generated in the bright fringes were found to screen the applied electric fields by trapping at the arsenic precipitates. The trapped space-charge produced a spatial modulation of the internal electric field, and therefore also a modulation of the absorption coefficient and the refractive index of the GaAs:As material. The spatially modulated optical properties were found to act as diffraction gratings that diffracted the two beams. In two-wave mixing, the m=+1 diffraction order interfered with the m=0 direct beams. In four-wave mixing, the m=−1 first diffraction orders were observed separately.

The laser wavelength was then tuned to correspond to the peak in the electroabsorption. In the presence of an absorption grating alone, two-wave mixing produced equal beam modulation in the two beams. During the mixing, the bright interference fringes were positioned where the space-charge screening (and the absorption) is largest. This coherent interference process therefore leads to a reduced transmission.

If the two pump laser beams were crossed-polarized, then interference did not occur. The electric field in this case was uniform inside the LTG GaAs:As material, and the detected transmission increased relative to the case of polarized beams. Verification of the space-charge screening in the material was therefore observed as a polarization dependence of the transmitted beam intensities. A mechanical chopper was placed in one beam. A Si photodetector and a lock-in amplifier were used to detect modulation in the other beam.

Figure 2:
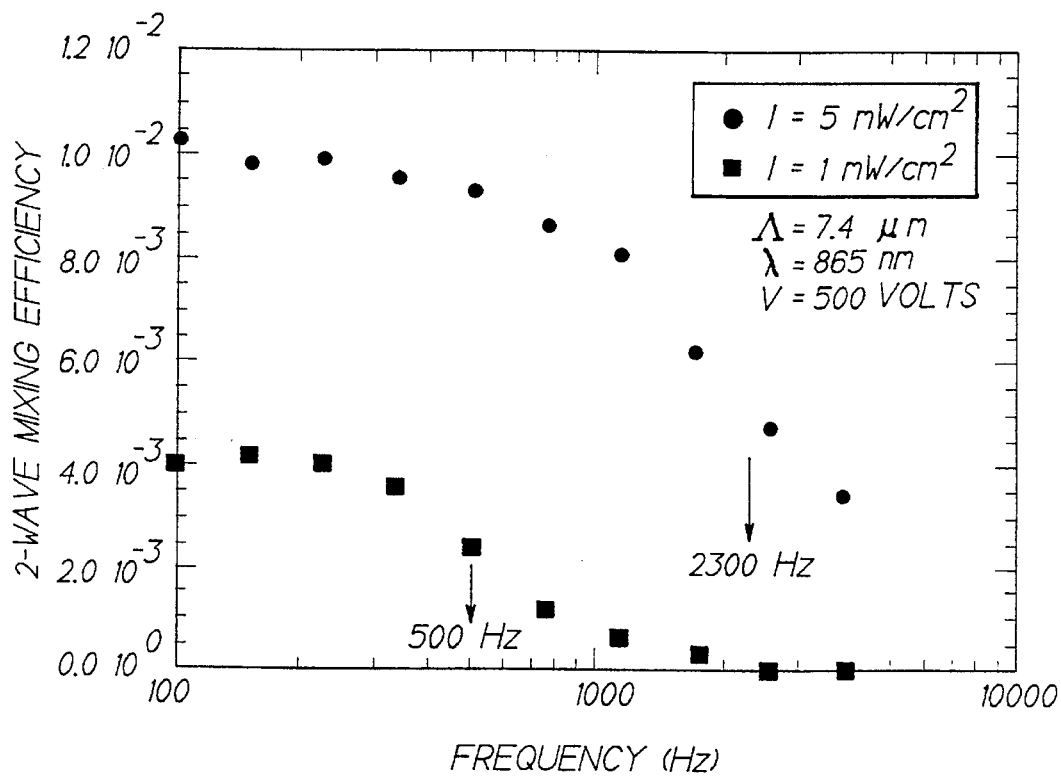
FIG. 2 is a graph that depicts two-wave mixing efficiency as a function of chopper frequency for two laser intensities.

The two-wave mixing efficiency as a function of chopper frequency is shown in FIG. 2 for two laser intensities. The mixing efficiency can be seen to increase with increasing laser intensity for intensities below the saturation intensity. In the sample, the saturation intensity is approximately 2 mW/cm$^2$. The frequency response for laser intensities below the saturation intensity is 500 Hz, giving a two millisecond response time. The response frequency was found to increase for increasing laser intensities. The frequency dependence of the mixing is caused by persistence of the grating. For high chopping frequencies the grating did not have sufficient time to relax, and the detected modulation was reduced.

The saturation intensity $I_{sat}$ is the laser intensity for which the photoconductivity exceeds the dark conductivity, in accordance with $I_{sat}=n_d/\alpha\tau$, where $n_d$ is the dark carrier density, $\alpha$ is the absorption and $\tau$ is the carrier lifetime. The device response time is given by:

$$\tau_D = \frac{\epsilon \epsilon_0}{\sigma_d + I_{sat} \alpha \theta \mu \tau} \left[ 1 + \left( \frac{2\pi\mu\tau E}{\Lambda} \right)^2 \right] \quad (1)$$

where E is the electric field strength and $\sigma_d$ is the dark conductivity. The response time of the material is $\tau_D$=2 msec at room temperature at 500 V with $\Lambda$=7.5 micrometers. At smaller fringe spacings, the decay time of the grating is longer. This response time is consistent with the saturation intensity data, and gives a product of mobility with dark density of $\mu n_d$=4×10$^9$ (cmVs)$^{-1}$. During mixing, the lifetime of the trapped space-charge is set by the rate at which the space-charge is neutralized by free carriers, and not by the thermal emission time of the trapped charge. At lower temperatures, the dark density decreases and the storage time increases dramatically. At 200K, a temperature that is readily accessible by thermoelectric cooling, the storage time is extrapolated to be one hour in the dark.

Figure 3:
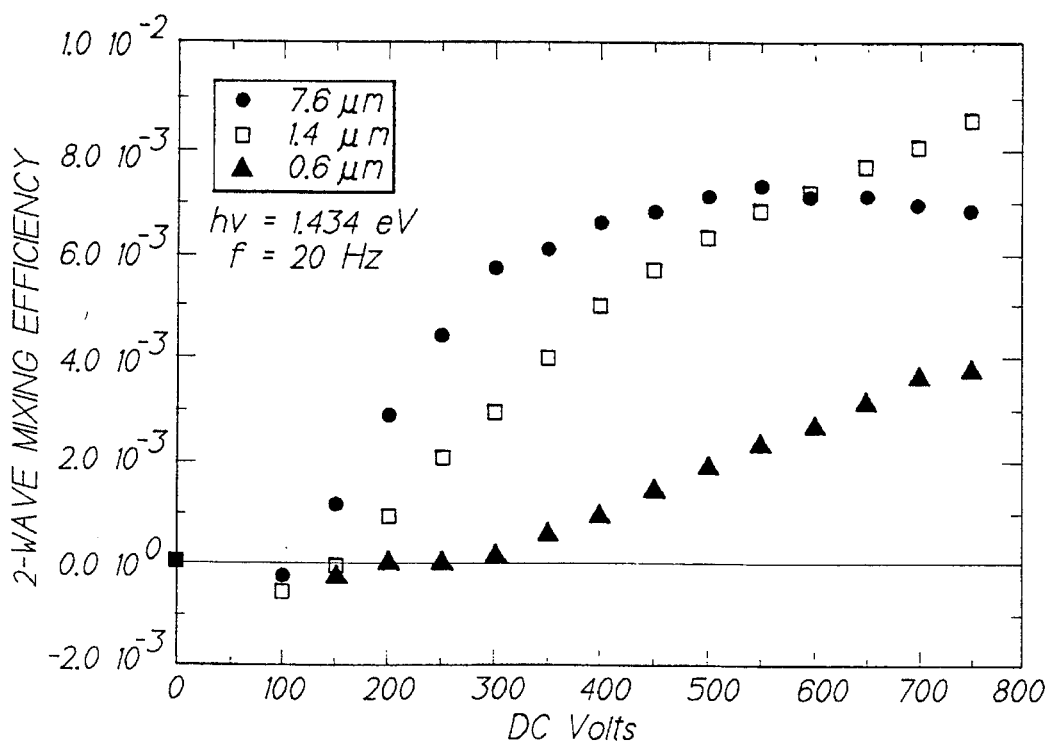
FIG. 3 is a graph that illustrates two-wave mixing results for three different fringe spacings as functions of applied voltage.

The two-wave mixing results are shown in FIG. 3 for three different fringe spacings as functions of applied voltage. The noise in the data was caused by Ti:Sapphire laser noise and was not intrinsic to the material. Diode lasers have significantly lower noise, and are presently preferred sources for the LBs 1 and 2.

The fringe spacing is given by $\Lambda=\lambda/2 \sin\theta$, where $\lambda=865$ nm is the laser wavelength and $\theta$ is the half-angle between the two interfering beams. No significant difference was observed for the two-wave mixing efficiencies at $\Lambda=7.7$ micrometers and $\Lambda=1.4$ micrometers. For $\Lambda=0.6$ micrometers, the mixing efficiency was found to begin to fall off. The minimum measured fringe spacing is therefore approximately $\Lambda_c=0.6$ micrometer.

The minimum fringe spacing defines the minimum pixel size for optical storage using holographic techniques. The data density for the GaAs:As material is therefore approximately $4\times10^8$ bits/cm$^2$ with a switching energy of $E_{sw}=I_{sat}\tau\Lambda_c^2\approx14$ fJ/bit. By comparison, the minimum fringe spacing for other photodiffractive devices are in the range of 5 micrometers to 20 micrometers. The LTG GaAs:As material therefore represents more than an order of magnitude improvement in optical density over conventional technologies.

For a resonant excitation of electrons and holes, the minimum fringe spacing is given by $$\Lambda_c = 2\pi L_D = 2\pi\sqrt{\frac{k_B T \mu\tau}{\theta}} \quad (2)$$

where $L_D$ is the diffusion length and $\mu\tau$ is the bipolar mobility-lifetime product. The holographic technique therefore provides a direct and accurate method to determine the diffusion length and $\mu\tau$ product. In the samples $L_D=80$ nm and $\mu\tau=2\times10^{-9}$ cm$^2$/Vs. The $\mu\tau$ product is more accurate than the values obtained from photoconductivity because it is independent of the electric field strength. For bulk photorefractive materials, minimum fringe spacings of 0.5 micrometer are relatively common. However, in the LTG GaAs:As material, thermal anneals provide great flexibility in tailoring the $\mu\tau$ product to smaller values. Thus, minimum fringe spacings approaching 0.1 micrometer are believed to be obtainable for optimized material.

Figure 4:
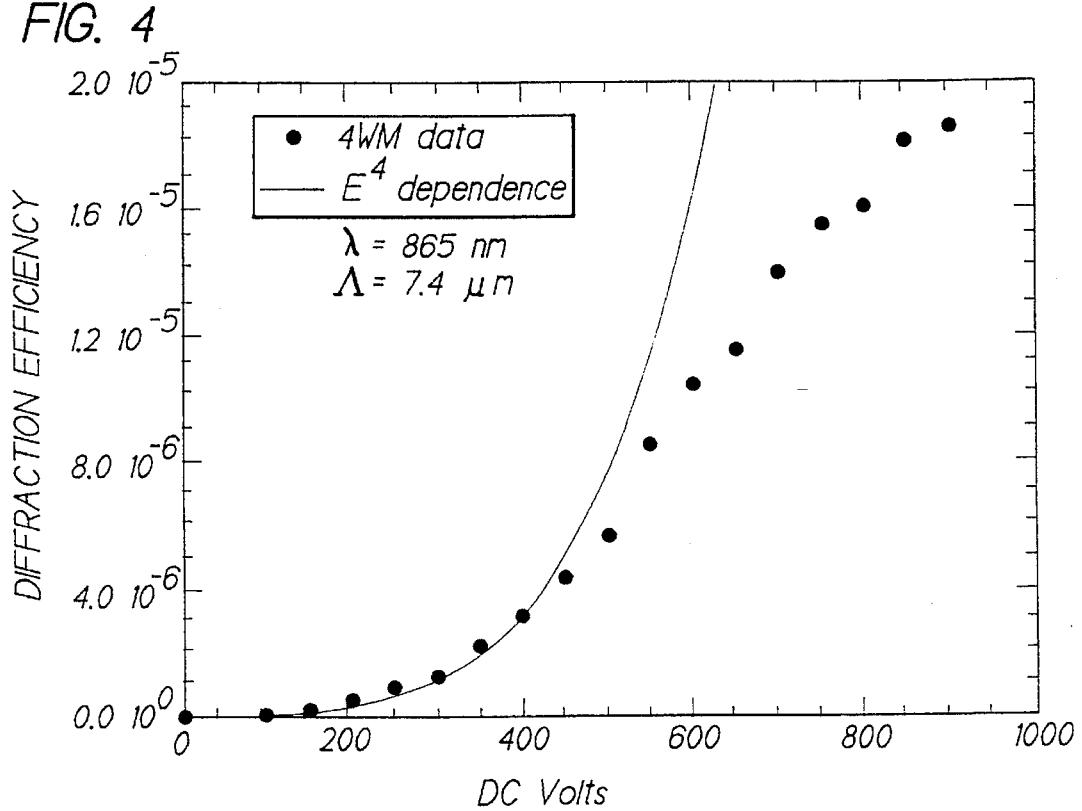
FIG. 4 is a graph depicting four-wave mixing diffraction efficiency.

Four-wave mixing diffraction efficiency is shown in FIG. 4. As for the case of FIG. 3, the noise in the data was caused by Ti:Sapphire laser noise and was not intrinsic to the material. The diffraction efficiency $\eta$ is defined as the ratio of the diffracted laser intensity to the transmitted beam intensity. The diffraction efficiency increases approximately with the fourth power of applied field for small fields, but deviates above values of $1\times10^5$ for biases greater than 600 V. These diffraction efficiencies are comparable with diffraction efficiencies obtained for photorefractive quantum well structures. The mechanism of charge trapping by the arsenic precipitates therefore provides highly efficient screening of applied fields.

In conclusion, Example 1 has described both two-wave and four-wave photodiffractive mixing in LTG GaAs for low intensity laser photon energies that are close to the bandgap. The novel space-charge screening caused by the arsenic precipitates in the GaAs:As material is efficient, and has been shown to be capable of supporting small minimum fringe spacings.

EXAMPLE 2

Electro-optic measurements were performed on three epitaxial layers grown by molecular beam epitaxy: 1) a 1.1 micrometer layer of GaAs grown as a reference sample under normal growth conditions at 600° C.; 2) a 1.0 micrometer layer of GaAs grown at a low substrate temperature of 200° C., and 3) a 1.0 micrometer layer of Al$_{0.25}$Ga$_{0.75}$As also grown at a low substrate temperature of 200° C. All three layers were grown on a 50 nanometer layer of AlAs that was fabricated under normal high temperature conditions. As in Example 1, the AlAs layer is a sacrificial layer used for the epitaxial lift-off technique.

After growth, the two LTG wafers were annealed to allow the As precipitates to form. The LTG GaAs layer was annealed at 600° C. for one hour in the MBE chamber before unloading. The LTG AlGaAs layer was annealed using rapid thermal annealing at 700° C. for 30 seconds. For both of these annealing conditions, the average precipitate sizes were found to be approximately seven nanometers, with an average precipitate spacing of approximately 23 nanometers. No annealing was performed on the conventionally grown GaAs layer. However, so as to be able to support a large electric field without Joule heating, the GaAs was made semi-insulating by proton implantation with a flux of $10^{12}$ cm$^2$. Proton implantation at this dose has no appreciable effect on the exciton linewidth, and has been used in photorefractive quantum well structures without observable adverse effects on electro-optic properties.

To measure transmitted signals through the samples, the epitaxial layers were removed from the substrates using the epitaxial lift-off technique and bonded to transparent glass slides. Two gold contacts were evaporated on each sample with a one millimeter separation between contacts. Thin wires connected the gold layers to a high voltage DC power supply that supplied 1 kV. The contacts were tested for symmetry and linearity.

The electroabsorption of the epitaxial thin films was obtained by performing differential transmission experiments using a SPEX 1700 Czerny-Turner spectrometer and an incandescent tungsten light source. The experiments were performed with DC electric fields to remove the different frequency dependences for the three materials. For the large absorption coefficients for interband transitions, it is a reasonable approximation to neglect effects of multiple beam interference from the Fabry-Perot fringes on the measurement of $\Delta\alpha$.

Figure 5:
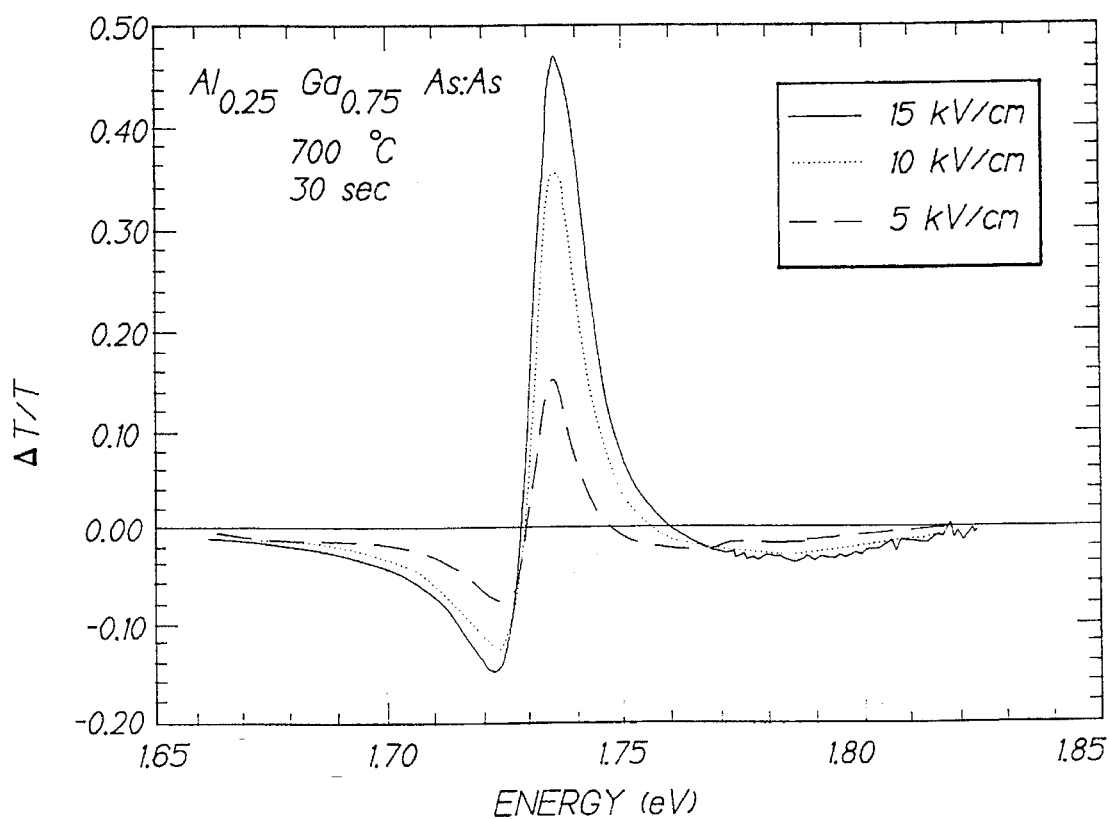
FIG. 5 is a graph that illustrates the differential transmission of a $Al_{0.25}Ga_{0.75}As$:As sample as a function of photon energy for increasing electric fields.
Figure 6:
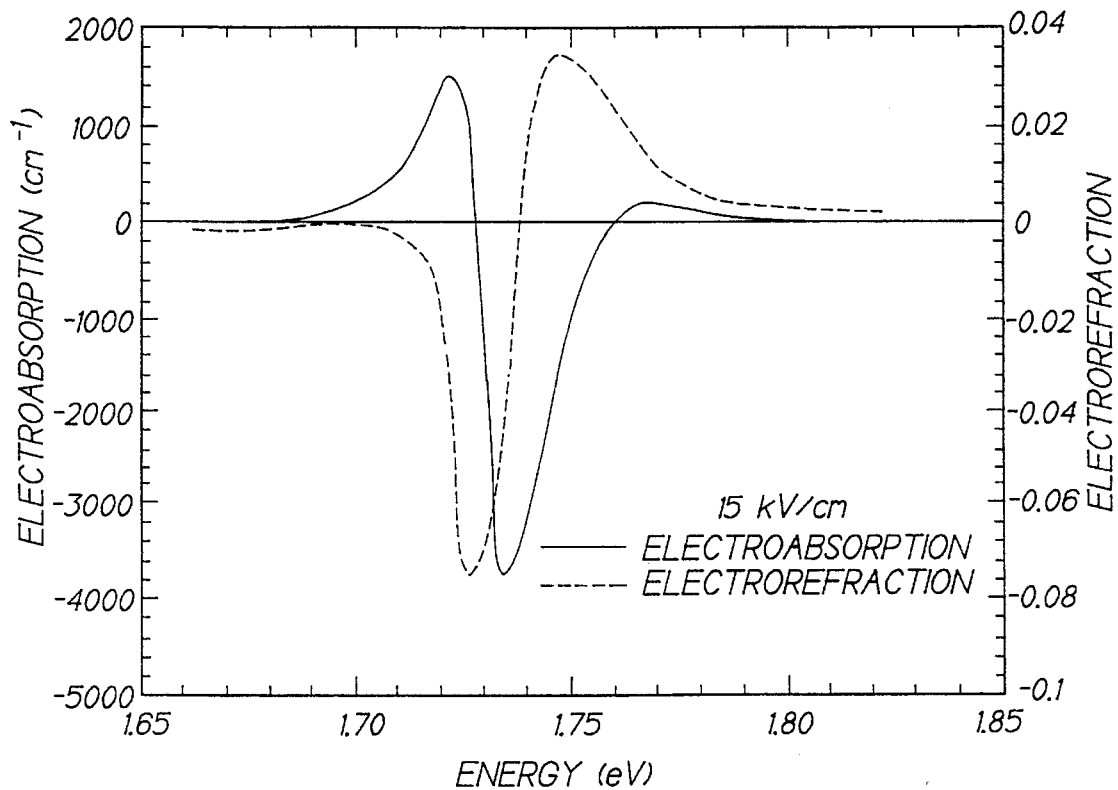
FIG. 6 is a graph that depicts electroabsorption and electrorefraction data for the $Al_{0.25}Ga_{0.75}As$:As sample with an electric field strength of 15 kV/cm.

The differential transmission of the Al$_{0.25}$Ga$_{0.75}$As:As sample is shown in FIG. 5 as a function of photon energy for increasing electric fields. The relatively sharp feature at 1.730 eV corresponds to room-temperature excitons. A differential transmission approaching 50% differential transmission is comparable to values in electro-optic modulators based on the quantum-confined Stark effect in quantum well structures. The electroabsorption and electrorefraction data are shown in FIG. 6 for 15 kV/cm. The data were obtained by fitting the differential transmission with smooth functions and performing a Kramers-Kronig analysis. The electrorefraction was found to approach 0.1 for this electric field.

Figure 7:
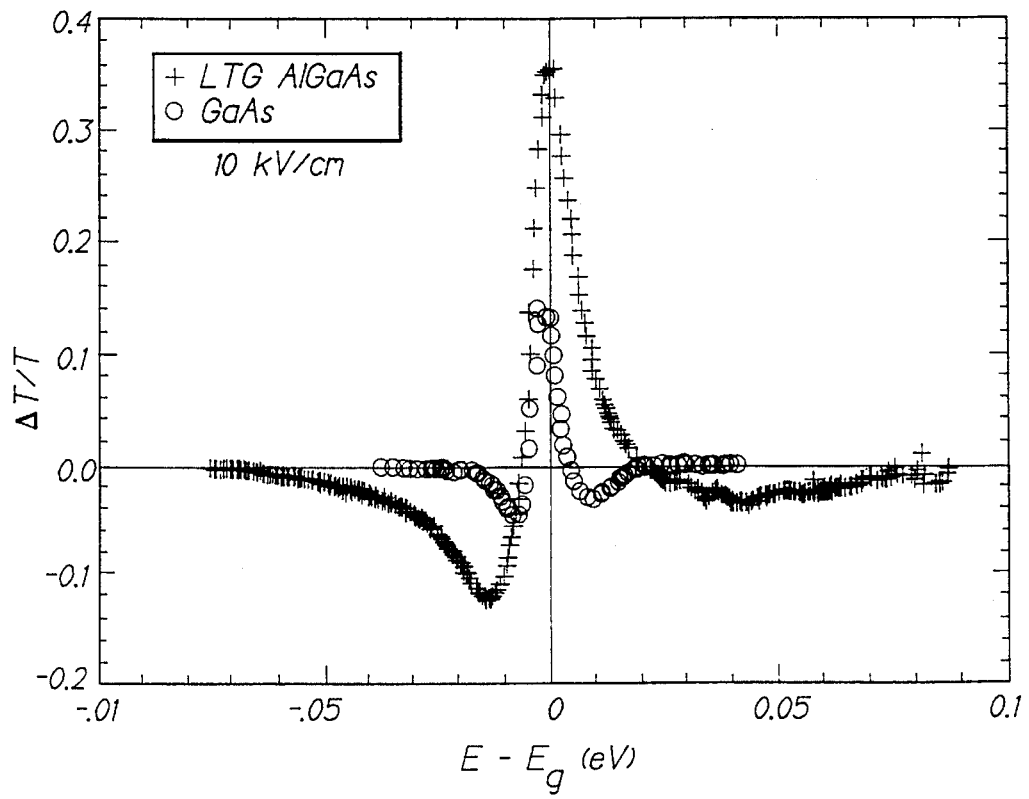
FIG. 7 is a graph that contrasts the electroabsorption of the $Al_{0.25}Ga_{0.25}As$:As sample with a GaAs sample for an electric field of 10 kV/cm.

The electroabsorption of Al$_{0.25}$Ga$_{0.25}$As:As is compared with GaAs in FIG. 7 for an electric field of 10 kV/cm. The photon energy is plotted relative to the bandgap energy $E_g$. For fields of 10 kV/cm the differential transmission of the AlGaAs:As sample approaches 36%. The GaAs sample, on the other hand, exhibits a differential transmission of only 16% for the same field strength. The width of the LTG differential transmission is significantly broader than for the GaAs sample. This is expected on the grounds of inhomogeneous broadening of the exciton transition in the LTG material, in that the As precipitates perturb the material homogeneity. The electroabsorption in the LTG GaAs was also measured. A peak differential transmission of 10% was observed, which is comparable to the GaAs sample, despite the significantly broader linewidth.

The large differential transmission values up to 50% in the LTG materials are unexpected in view of the severe inhomogeneous broadening that occurs because of the presence of the As precipitates, in that broad excitonic transitions normally exhibit weak electroabsorption. The product of the linewidth $\Gamma$ of an exciton transition with the peak absorption $\alpha_p$ is proportional to the exciton oscillator strength. Because the oscillator strength is an intrinsic property of the material, the peak absorption is therefore inversely proportional to the transmission linewidth. If the transition width is inhomogeneously broadened, the peak absorption is reduced. Similar arguments apply for electroabsorption; i.e., broad, low transition lines exhibit small electroabsorption. This fundamental trend is described by the relation $$\Delta\alpha_p \Gamma^2 \propto f_{ex}\Delta\Gamma \quad (3)$$

for small modulation, where $f_{ex}$ is the exciton oscillator strength. For the materials of this Example, the lifetime broadening $\Delta\Gamma$ caused by the electric field should be approximately equal among the different LTG samples. This is because the exciton lifetime broadening is relatively insensitive to small changes in the exciton binding. Oscillator strengths, on the other hand, can be strongly altered by small changes in exciton binding because of the dependence of the oscillator strength on the third power of the Bohr radius. The large electroabsorption $\Delta\alpha$ in the LTG materials is believed to occur through an enhancement of the product $F_{ex}\Gamma$ in the LTG material.

In order to make a quantitative comparison of electro-optic properties among the different materials, it is necessary to know the oscillator strength. However, it is exceedingly difficult to quantify exciton oscillator strength in a semiconductor. Therefore, a figure of merit, based on moments of the electroabsorption, is employed instead to enable direct comparisons among electro-optic properties of different materials. First and second moments can be defined by $$d\alpha_{(1)} = \int_0^\infty n\Delta\alpha(\omega)d\omega = 0 \quad (4)$$

$$d\alpha_{(2)} = \frac{\left[\int_0^\infty n|\Delta\alpha(\omega)|d\omega\right]^2}{\Delta\alpha_p}$$

where n is the refractive index and $\Delta\alpha$ is the peak change in the absorption. The first moment of the electroabsorption of an isolated transition vanishes because of conservation of oscillator strength. The second moment of the electroabsorption is roughly equivalent to the expression in Equation 3, and is valid for the condition $\Delta\Gamma \ll \Gamma$.

It is important to emphasize that this figure of merit cannot be used for direct measurements of oscillator strength. The electric field dependence of electroabsorption is folded into the figure of merit through the lifetime broadening $\Delta\Gamma$. Another important issue is the uniformity of the electric field in the samples. The comparison of the second moments among different materials is only valid for equal electric field strengths.

Table 1: Ratios of second moments of electroabsorption relative to bulk GaAs

| 10 kV/cm | LTG AlGaAs | LTG GaAs | AlGaAs MQW |
|---|---|---|---|
| Ratio to GaAs | 12.9 | 15.4 | 3.5 |

The second moments of LTG GaAs and $Al_{0.25}Ga_{0.75}As$ are given in Table 1 relative to GaAs for electric fields of 10 kV/cm, the refractive index n is assumed to be approximately constant. In the table, LTG GaAs:As exhibits an enhancement over GaAs by a factor of 15. LTG AlGaAs:As also shows an enhancement by a factor of 13.

Included in Table 1 is the ratio of an $Al_{0.3}Ga_{0.7}As/GaAs$ multiple quantum well sample having 75 Angstrom wells and 100 Angstrom barriers. It can be seen that the second moment of the electroabsorption is considerably smaller in the MQW sample than in the LTG materials. This implies that for the exciton lifetime broadening of quantum-confined excitons, the sensitivity of the exciton to an electric field is decreased. Therefore, the exciton lifetime broadening of quantum-confined excitons is weaker than for bulk excitons, for a given electric field strength.

It can be seen that, based on the foregoing description, this invention provides an optically responsive heterogeneous material having a plurality of phases, wherein a phase is considered to be local area where the material properties are uniform. Between two phases, such as at a boundary between an elemental As inclusion and the surrounding GaAs matrix, there is a discrete change in thermochemical properties.

In accordance with the teaching of this invention, at least one phase of the heterogeneous material absorbs light and generates photoexcited carriers, at least one phase captures the photoexcited carriers, and at least one phase is a dielectric phase having optical constants that are a function of a local electric field. The transport and dielectric phases of the material are embodied in a semiconducting phase of high crystalline perfection (the epitaxial GaAs matrix), and the carrier capture phase is embodied in a metallic precipitate or inclusion. In accordance with the invention, the semiconducting crystalline material is a material having an excitonic transition, by example a Group III–V semiconductor material such as GaAs or AlGaAs, and the metal precipitate is comprised of, by example, As.

The invention has been described thus far in the context of a thin layer or film of LTG Group III–V material having elemental As precipitates contained therein. However, other configurations and embodiments are also within the scope of the teaching of this invention.

Figure 12:
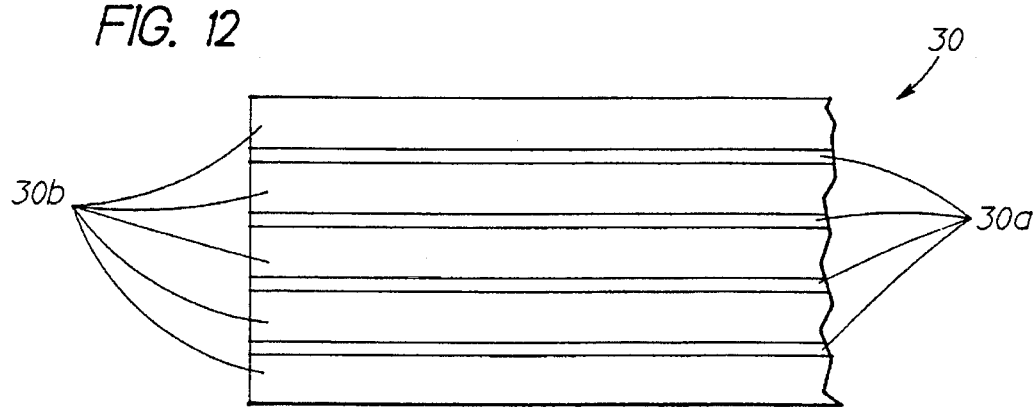
FIG. 12 is a cross-sectional view, not to scale, showing a volume holographic storage media that is comprised of a plurality of stacked, LTG Group III–V thin film media.

By example, and referring to FIG. 12, there is shown an embodiment of a bulk holographic media 30 that is comprised of a plurality of thin layers 30a (approximately 1000 Angstroms) of LTG Group III–V material. Interposed between each of the thin layers 30a is a layer 30b (approximately one micron) of AlGaAs. The media 30 can be fabricated by multiple low temperature/normal temperature depositions. A single high temperature anneal may be accomplished after growing the structure to precipitate the excess As within the LTG layers 30a, although it should be noted that the periodic normal (higher) temperature depositions of the AlGaAs buffer layers 30b may be sufficient to anneal the previously grown underlying LTG layers.

The bulk holographic media 30 is employed with angle multiplexing, frequency multiplexing, or phase multiplexing techniques so as to record and readout information from the distributed hologram represented by the layers 30a. The use of AlGaAs for the intermediate layers 30b is advantageous in that the difference in the index of refraction of AlGaAs and GaAs is not large at the wavelengths employed for the recording and probe light beams. A slight detuning down to 50 meV below the band-edge of the recording and probe light energy can be accomplished. The slight detuning has the effect of reducing the nonlinearity of the material, while also decreasing the absorption. A reduction in the absorption is advantageous in those applications where it is desired to transmit a light beam through a substantial thickness of the non-linear optical material, such as would occur with cascaded optical devices. If the amount of absorption is not of concern, it may be desirable not to detune and to operate instead at the point of greatest nonlinearity. To achieve optical amplification, as described below, detuning is preferred.

In regard to the embodiment of FIG. 12 reference is made to an article entitled "Stratified volume holographic optical elements", by R. V. Johnson and A. R. Tanguay, Jr., Optics Letters, Vol. 13, No. 3, pp. 189–191, 3/88. This article describes a class of devices by which Bragg regime (thick grating) response can be obtained from a spaced sequence of thin grating layers. A stratified volume holographic element (SVHOE) is said to emulate distributed volume gratings in terms of diffraction efficiency and angular selectivity.

Figure 10:
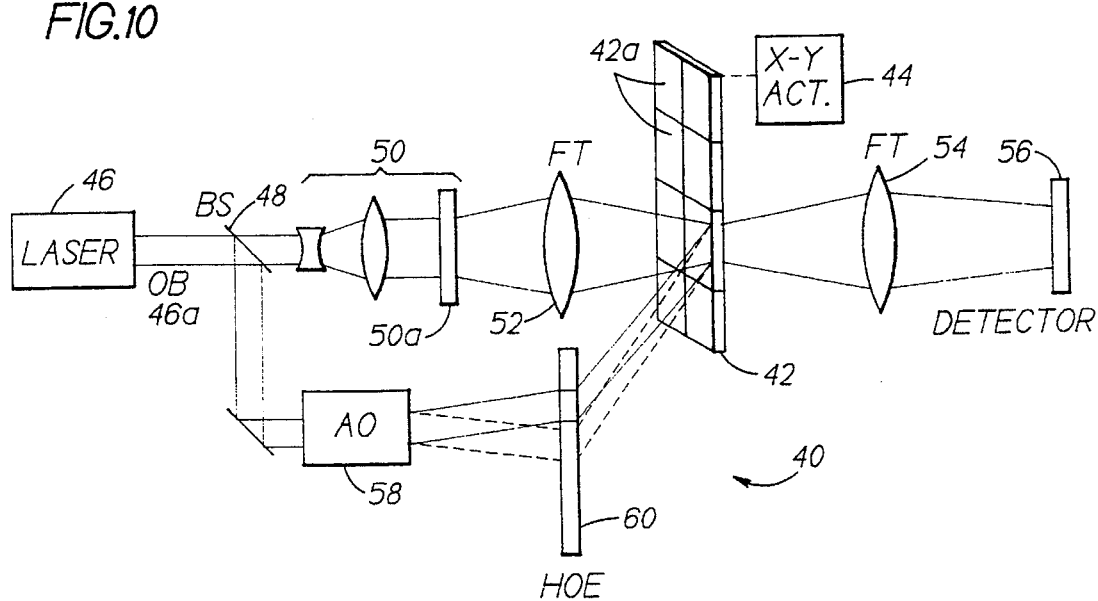
FIG. 10 is block diagram showing an embodiment of an information storage and retrieval system that incorporates the LTG Group III–V non-linear optical material of the invention.

Reference is now made FIG. 10 for showing a block diagram of an embodiment of an information storage and retrieval system 40 that incorporates the LTG Group III–V non-linear optical material of the invention. An array 42 (for example 2×4 or 4×4) of holographic media 42a is provided. Each of the media 42a includes a thin-film holographic layer or a stacked (stratified) bulk holographic structure, as in FIG. 12, that is comprised of the LTG Group III–V composite material of the invention. The array 42 is coupled to an X-Y actuator 44 for being translated thereby within a translation plane. A laser 46 provides an output beam (OB 46a) that is split by a beamsplitter 48.

When writing information, a first beam is shaped by optics 50 and is applied to a Fourier transform element, shown as a focussing lens FT 52, which focusses the first beam onto a region within one of the media 42a of the array 42. An element of the optics 50 is a spatial light modulator 50a, embodied within a liquid crystal device (LCD) having a resolution of some number of pels. The information to be recorded within the array 42 is applied to the LCD 50a which intensity modulates the first beam. A second beam, having a wavelength identical to the first beam, exits the beamsplitter 48 and is directed to an acoustooptic (AO) device 58 which angle multiplexes the second beam so that the second beam exits the AO device 58 at one of a plurality of exit angles. A Holographic Optical Element (HOE) 60 receives the angle multiplexed second beam and directs same to a predetermined region upon the array 42. The predetermined region is selected to coincide with the area within which the first beam is focussed by the FT 52. The information pattern is recorded within a selected one of the media 42a, in the manner described above with respect to FIGS. 1a, 1b, 11a, and 11b.

When reading information, only the second beam need be employed. The array 42 is positioned at desired X-Y coordinates, the second beam is angle multiplexed at a required angle, and impinges upon the selected media 42a. The diffracted output beam from the media 42a is received by a second FT lens 54 and is directed to a radiation detector array 56. The spatial intensity distribution of the detected second beam is representative of the intensity modulation of the first beam that was previously applied by the LCD 50a, enabling the holographically stored information content to be retrieved and reconstructed.

The system 40 may also be arranged to work in reflection, as with the embodiment of FIG. 11a.

FIG. 13 illustrates a cross-sectional view of an embodiment of the invention wherein the LTG Group III–V material is compositionally graded so as to provide an intrinsic bias electric field, thereby reducing or eliminating the requirement to provide external bias electrodes and potentials. An energy band diagram for the structure is shown superimposed thereon.

In this embodiment of the invention, LTG Group III–V material layer 74 is deposited upon a substrate 72. During the LTG MBE deposition process, the sources are selected so as to first grow a region of GaAs. The sources are then varied so as to compositionally grade the layer 74 so that AlGaAs material is deposited. After deposition, the high temperature anneal is performed so as to precipitate the excess As, as described in detail above. The resulting intrinsic electric field of the compositionally graded LTG Group III–V layer operates to cause the charge carriers that are generated within the bright fringes to drift to the dark fringes. The charge carriers are trapped by the As inclusions, as described above, resulting in the formation of the localized electric fields that locally influence the optical properties of the Group III–V matrix. The substrate 72 can be subsequently removed, as described above.

As an example, the low temperature growth of $Al_xGa_{1-x}As$, where x is initially approximately equal to zero, is initiated upon the substrate 72. A one micrometer thick layer 74 is grown, with the relative compositions of the source elements being varied during growth such that the upper top portion of the layer 74 is comprised of $Al_xGa_{1-x}As$, where x is equal to approximately 0.9.

It is also within the scope of the invention to provide GaAs having inclusions comprised of chromium or aluminum, and to construct non-linear optical storage media therefrom.

Alternatively, the invention can be practiced with Ge having Ni inclusions. When employing Ni in Ge, the Ni is first diffused into the Ge, and the structure is then annealed. The annealing precipitates the diffused Ni, and forms Ni inclusions within the Ge matrix.

The formation of a matrix of GaAs with either Al or Cr inclusions is accomplished as follows. After normal MBE growth of a layer of GaAs between 20 nm and 200 nm thick, at a temperature of approximately 600° C. to 650° C. the growth is interrupted and the Ga, As, and dopant sources are shuttered. To generate Cr inclusions, between 5 and 10 monolayers of Cr are deposited on the 600°–650° C. GaAs surface. The Cr coalesces into "islands". Next, normal MBE growth of 20–200 nm of GaAs is continued. The Cr islands are buried in the GaAs matrix as Cr inclusions. The Cr inclusions function to trap the charge carriers in the dark fringe regions, in a manner analogous to the As inclusions described above. This cycle is repeated as many times as is necessary to generate a matrix of desired thickness. To generate Al inclusions, several monolayers of AlAs are grown by normal MBE on the GaAs layer prior to growth interruption. Next, with the Ga, As, and dopants shuttered, between 5 and 10 monolayers of Al are deposited on the 600°–650° C. AlAs surface. The Al coalesces into "islands". Next several monolayers of AlAs are grown by normal MBE and the AlAs conformally coats the Al islands. Next, 20–200 nm of GaAs is grown by normal MBE to bury the Al islands in the GaAs matrix. This cycle is repeated as many times as is necessary to generate a matrix of desired thickness.

In general, any metal may be employed that has a desired work function and that has a sufficient surface mobility to form islands, including niobium.

Although described in the context of a Group III–V or Ge semiconductor material, it should be realized that the teaching of the invention encompasses any semiconductor material that exhibits an excitonic transition, wherein the semiconductor material includes metallic inclusions as described above.

Furthermore, the distribution of charge can occur from bright fringes to dark fringes, as described above, or from gray fringes to gray fringes. The difference is significant. In the first case (bright fringes to dark fringes) there is a spatial shift of the optical charges relative to the light intensity fringes. This spatial shift is referred to as a photorefractive phase shift and is the origin of optical gain.

Figure 14:
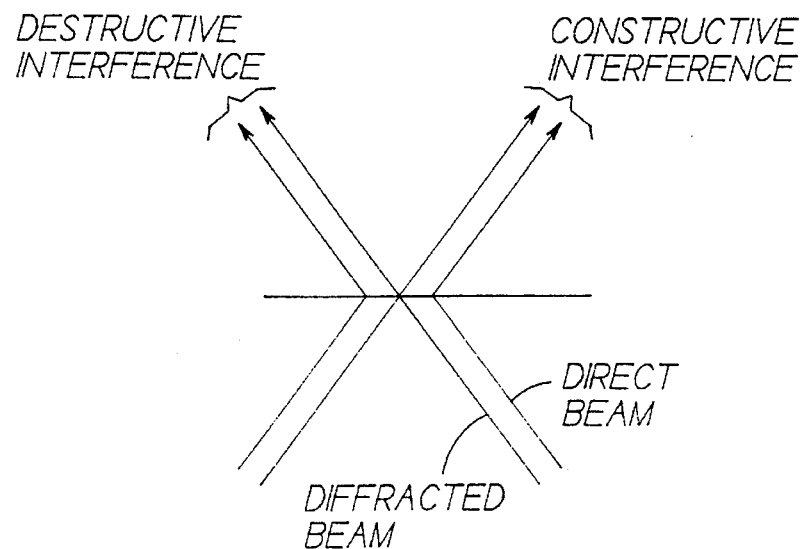
FIG. 14 illustrates an example of non-reciprocal energy transfer between light beams in the presence of a photorefractive phase shift.

Referring to FIG. 14, in photorefractive gain there is non-reciprocal energy transfer from one laser beam to another. If the photorefractive gain exceeds the absorption, then there is net optical amplification. Net gain is a key to many photorefractive applications, including self-pumped phase conjugation. As was noted above, detuning may be desirable so as to reduce the absorption.

In the case of the charge distributing from gray fringes to adjacent gray fringes, there is a screening of applied electric fields without a phase shift. In this case there is no energy transfer between the laser beams.

The LTG thin layers described above may operate in either or both of the two modes described above. By example, the inventors have obtained data from MQW samples showing a phase shift that is a function of the applied electric field, the phase shift varying from 0° to nearly 90° for fields ranging from 0 to 10 kV/cm.

While the invention has been particularly shown and described with respect to preferred embodiments thereof, it will be understood by those skilled in the art that changes in form and details may be made therein without departing from the scope and spirit of the invention.

Having thus described our invention, what we claim as new, and desire to secure by Letters Patent, is:

1. A light responsive device having a body portion that is comprised of an optically active, non-quantum well heterogeneous region comprised of at least one layer of a Group III–V matrix material having inclusions comprised of a Group V material contained within said matrix material, said optically active, non-quantum well heterogeneous region being responsive to a presence of an electromagnetic radiation field that has a periodic spatially varying intensity within a volume of said region for modifying, in a corresponding spatially varying manner, a distribution of trapped photoexcited charge carriers within said volume of said region, the distribution of trapped charge carriers inducing a corresponding spatial variation in at least one optical property of said Group III–V matrix material within said region.

2. A device as set forth in claim 1 wherein said at least one optical property is an index of refraction of said Group III–V matrix material.

3. A device as set forth in claim 1 wherein said at least one optical property is an absorption coefficient of said Group III–V matrix material.

4. A device as set forth in claim 1 wherein the periodic spatial variation in the intensity of the electromagnetic radiation field results from a simultaneous application of a first light beam and a second light beam to said body portion, and from interference fringes resulting from an intersection of said first and second light beams.

5. A device as set forth in claim 1 wherein said Group III–V matrix material is comprised of GaAs, and wherein said inclusions are comprised of As.

6. A device as set forth in claim 1 wherein said Group III–V matrix material is comprised of AlGaAs, and wherein said inclusions are comprised of As.

7. A device as set forth in claim 1 wherein the spatially varying distribution of said trapped charge carriers persists for a period of time after an extinction of the electromagnetic radiation field, the period of time having a duration that is a function of a resistivity of said Group III–V matrix material.

8. A device as set forth in claim 1 wherein said optically active, non-quantum well heterogeneous region functions as an optical storage medium, and wherein the spatial variation of the intensity of the electromagnetic radiation field encodes information.

9. A device as set forth in claim 8 wherein the periodic spatial variation in the intensity of the electromagnetic radiation field results from a simultaneous application of a first light beam and a second light beam to said optically active, non-quantum well heterogeneous region.

10. A device as set forth in claim 1 and further comprising a first electrode means that is disposed upon a surface of said body portion and a second electrode means that is disposed upon a surface of said body portion, said first and second electrode means being electrically coupled during use to an electrical potential for establishing an electric field within said optically active, non-quantum well heterogeneous region.

11. A light responsive device having a body that includes an optically active heterogeneous region comprised of a Group III–V matrix material having inclusions comprised of a Group V material contained therein, said optically active heterogeneous region being responsive to a presence of an electromagnetic radiation field that has a spatially varying intensity for modifying, in a corresponding spatially varying manner, a distribution of trapped photoexcited charge carriers within said region, the distribution of trapped charge carriers inducing a corresponding spatial variation in at least one optical property of said Group III–V matrix material, wherein said Group III–V matrix material is compositionally graded for establishing an electric field within said matrix material.

12. A method of storing a pattern within an optical storage medium, comprising the steps of:

providing a non-quantum well optical storage medium that includes a matrix comprised of at least one layer of Group III–V material having inclusions comprised of a Group V material contained therein;

illuminating the medium with an electromagnetic radiation field having a periodic spatially varying intensity profile characterized by alternating bright and dark fringes within a volume of the matrix;

within a bright fringe, ejecting photoexcited charge carriers into the matrix;

within a dark fringe, trapping photoexcited charge carriers with the inclusions; and responsive to a spatial distribution of an electric field resulting from a redistribution of charge carriers between the bright and dark fringes within the volume of the matrix, inducing a corresponding spatial variation in at least one optical property of the Group III–V material within the matrix.

13. A method as set forth in claim 12 wherein the at least one optical property is an index of refraction of the Group III–V material.

14. A method as set forth in claim 12 wherein the at least one optical property is an absorption coefficient of the Group III–V material.

15. A method as set forth in claim 12 wherein the step of illuminating includes a step of simultaneously applying a first light beam and a second light beam to the optical storage medium.

16. A method as set forth in claim 12 wherein the Group III–V material is comprised of GaAs, and wherein said inclusions are comprised of As.

17. A method as set forth in claim 12 wherein the Group III–V material is comprised of AlGaAs, and wherein said inclusions are comprised of As.

18. A method as set forth in claim 12 and further including a preliminary step of establishing an electric field within the optical storage medium, the electric field having a magnitude sufficient to move the ejected photoexcited charge carriers through said matrix.

19. A method as set forth in claim 18 wherein said electric field is established by electrode means that are disposed externally to said optical storage medium.

20. A method of storing a pattern within an optical storage medium, comprising the steps of:
providing an optical storage medium that includes a matrix comprised of Group III–V material having inclusions comprised of a Group V material contained therein;
establishing an electric field within the optical storage medium, the electric field having a magnitude sufficient to move photoexcited charge carriers through said matrix;
illuminating the medium with an electromagnetic radiation field having a spatially varying intensity profile characterized by alternating bright and dark fringes;
within a bright fringe, ejecting photoexcited charge carriers into the matrix;
within a dark fringe, trapping photoexcited charge carriers with the inclusions; and
responsive to a spatial distribution of an electric field resulting from a redistribution of charge carriers between the bright and dark fringes, inducing a corresponding spatial variation in at least one optical property of the Group III–V material;
wherein said electric field is established internally to said optical storage medium due to a compositional grading of the Group III–V material.

21. A non-linear optical storage medium, comprising:
an optically responsive body portion that includes at least two phases and that is comprised of a semiconductor material containing a plurality of sites, each of said sites functioning to confine excitons that are generated within said body in response to an illumination of said body with a spatially periodic light field; wherein
said semiconductor material is a first one of said at least two phases and is comprised of a semiconductor material that exhibits an excitonic transition, and wherein
each of said sites is a portion of a second one of said at least two phases and consists of a metallic body, wherein an average diameter of said metallic bodies is greater than approximately one nanometer.

22. An optically responsive heterogeneous material having a plurality of phases, wherein at least one phase of the heterogeneous material absorbs spatially modulated light and generates photoexcited charge carriers, at least one phase of the heterogeneous material captures the photoexcited charge carriers, and at least one phase of the heterogeneous material is a dielectric phase having optical constants that are a function of a local electric field, wherein said light absorbing phase and said dielectric phase of the heterogeneous material are a semiconductor material comprised of at least one metal, and wherein said carrier capture phase is comprised of a plurality of inclusions each of which consists of a precipitate of the metal that is contained within said semiconductor material.

23. An optically responsive heterogeneous material as set forth in claim 22 wherein the semiconductor material is comprised of a Group III–V semiconductor material, and wherein the metallic precipitate is comprised of As.

24. An optically responsive heterogeneous material as set forth in claim 22 wherein the semiconductor material is comprised of a Group III–V semiconductor material, and wherein the metallic precipitate is comprised of Cr.

25. An optically responsive heterogeneous material having a plurality of phases, wherein at least one phase of the heterogeneous material absorbs light and generates photoexcited charge carriers, at least one phase of the heterogeneous material captures the photoexcited charge carriers, and at least one phase of the heterogeneous material is a dielectric phase having optical constants that are a function of a local electric field; wherein said transport phase and said dielectric phase of the heterogeneous material are a semiconductor material, wherein said carrier capture phase is a metallic precipitate contained within said semiconductor material; wherein the semiconductor material is comprised of a Group III–V semiconductor material, and wherein the metallic precipitate is comprised of Al.

26. An optically responsive heterogeneous material having a plurality of phases, wherein at least one phase of the heterogeneous material absorbs light and generates photoexcited charge carriers, at least one phase of the heterogeneous material captures the photoexcited charge carriers, and at least one phase of the heterogeneous material is a dielectric phase having optical constants that are a function of a local electric field; wherein said transport phase and said dielectric phase of the heterogeneous material are a semiconductor material, wherein said carrier capture phase is a metallic precipitate contained within said semiconductor material; wherein the semiconductor material is comprised of a Group III–V semiconductor material, and wherein the metallic precipitate is comprised of Nb.

27. An optically responsive heterogeneous material having a plurality of phases, wherein at least one phase of the heterogeneous material absorbs light and generates photoexcited charge carriers, at least one phase of the heterogeneous material captures the photoexcited charge carriers, and at least one phase of the heterogeneous material is a dielectric phase having optical constants that are a function of a local electric field; wherein said transport phase and said dielectric phase of the heterogeneous material are a semiconductor material, wherein said carrier capture phase is a metallic precipitate contained within said semiconductor material; wherein the semiconductor material is comprised of Ge, and wherein the metallic precipitate is comprised of Ni.

28. A holographic storage medium, said medium being comprised of a non-quantum well active region having at least one layer comprised of a Group III–V semiconductor material and a plurality of Group V metallic precipitates dispersed within the semiconductor material, said metallic precipitates exhibiting a bandgap energy of magnitude suitable for trapping photogenerated charge carriers for inducing a spatially varying electric field within a volume of said Group III–V semiconductor material, the spatially varying electric field inducing a corresponding spatial variation in at least one optical property of said Group III–V semiconductor material within the volume of said Group III–V semiconductor material.

29. A holographic storage medium as set forth in claim 28 and further including a plurality of electrode means that are coupled to said medium for establishing an electric field within said medium.

30. A holographic storage medium as set forth in claim 28 wherein said medium is a multi-layered structure that includes a plurality of layers of said Group III–V semiconductor material having a plurality of Group V precipitates dispersed within the semiconductor material, each of said plurality of layers being disposed one above another.

31. A holographic storage medium as set forth in claim 28 wherein said Group III–V semiconductor material is comprised of GaAs, and wherein said metallic precipitates consist of As.

32. A holographic storage medium as set forth in claim 28 wherein said Group III–V semiconductor material is comprised of AlGaAs, and wherein said metallic precipitates consist of As.

33. A holographic storage medium, said medium being comprised of Group III–V semiconductor material having a plurality of Group V precipitates dispersed within the semiconductor material, said precipitates trapping photogenerated charge carriers for inducing a spatially varying electric field within said Group III–V semiconductor material, the spatially varying electric field inducing a corresponding spatial variation in at least one optical property of said Group III–V semiconductor material, wherein said Group III–V semiconductor material is compositionally graded for establishing an electric field within said medium.

34. A holographic storage medium, said medium being comprised of Group III–V semiconductor material having a plurality of Group V precipitates dispersed within the semiconductor material, said precipitates trapping photogenerated charge carriers for inducing a spatially varying electric field within said Group III–V semiconductor material, the spatially varying electric field inducing a corresponding spatial variation in at least one optical property of said Group III–V semiconductor material, wherein said medium includes a single layer of said Group III–V semiconductor material having a plurality of Group V precipitates dispersed within the semiconductor material.

35. An information storage and retrieval system, comprising:
   a source of electromagnetic radiation;
   means for spatially modulating an output of said source in accordance with information to be stored, said modulating means outputting a spatially modulated light beam; and
   an optical storage medium disposed for receiving the spatially modulated light beam in conjunction with a second light beam having a wavelength selected for providing, within said optical storage medium, constructive and destructive interference with a wavelength of said spatially modulated light beam, wherein said optical storage medium is comprised of a non-quantum well active region having at least one layer comprised of a Group III–V semiconductor material and a plurality of elemental metallic precipitates comprised of a Group V element dispersed within said semiconductor material, said elemental metallic precipitates being a separate phase within said semiconductor material capable of trapping photogenerated charge carriers for inducing a spatially varying electric field within said Group III–V semiconductor material, the spatially varying electric field inducing a corresponding spatial variation in at least one optical property of said Group III–V semiconductor material for storing information within the optical storage medium.

36. An information storage and retrieval system as set forth in claim 35 and further comprising detector means disposed for receiving a spatially modulated light beam that is output by said medium in response to an application of only said second light beam to said medium, said detector means detecting the spatial modulation of the received diffracted beam.

37. A volume holographic medium, comprising:
   a plurality of active layers each of which is comprised of a Group III–V matrix material having inclusions comprised of a Group V material contained therein, each of said active layers being responsive to a presence of an electromagnetic radiation field that has a periodic spatially varying intensity for modifying, in a corresponding spatially varying manner, a distribution of trapped photoexcited charge carriers within said active layer, the distribution of trapped charge carriers inducing a corresponding spatial variation in at least one optical property of said Group III–V matrix material; and
   a plurality of buffer layers, individual ones of said plurality of buffer layers being interposed between two adjacent ones of said active layers, wherein
   said active layers have a thickness that is sufficient to preclude a generation of a significant quantum well confinement effect for a photogenerated exciton, and wherein said active layers are substantially free of intentionally generated deep levels.

38. An optically responsive material having photorefractive gain, comprising:
   an optically responsive body that includes at least two phases and that is comprised of a semiconductor material that contains a plurality of sites, said sites functioning to confine excitons that are generated within said body in response to an illumination of said body; wherein
   said semiconductor material is a first one of said at least two phases and is comprised of a semiconductor material that exhibits an excitonic transition, and wherein
   each of said sites forms a portion of a second one of said at least two phases and consists of a metallic body, wherein an average diameter of said metallic bodies is greater than approximately one nanometer.

39. An optically responsive material as set forth in claim 38 wherein said semiconductor material is comprised of a material selected from the group consisting of Group III–V material and germanium.

40. A light responsive device having a body that includes an optically active heterogeneous region consisting of a single layer of a Group III–V matrix material having inclusions comprised of a Group V material contained within said matrix material, said optically active heterogeneous region being responsive to a presence of an electromagnetic radiation field that has a periodic spatially varying intensity for modifying, in a corresponding spatially varying manner, a distribution of trapped photoexcited charge carriers within said region, the distribution of trapped charge carriers inducing a corresponding spatial variation in at least one optical property of said Group III–V matrix material.

41. A device as set forth in claim 40 wherein said at least one optical property is an index of refraction of said Group III–V matrix material.

42. A device as set forth in claim 40 wherein said at least one optical property is an absorption coefficient of said Group III–V matrix material.

43. A device as set forth in claim 40 wherein the periodic spatial variation in the intensity of the electromagnetic radiation field results from a simultaneous application of a first light beam and a second light beam to said body and from interference fringes resulting from an intersection of said first and second light beams.

44. A device as set forth in claim 40 wherein said Group III–V matrix material is comprised of GaAs, and wherein said inclusions are comprised of As.

45. A device as set forth in claim 40 wherein said Group III–V matrix material is comprised of AlGaAs, and wherein said inclusions are comprised of As.

46. A device as set forth in claim 40 wherein the spatially varying distribution of said trapped charge carriers persists for a period of time after an extinction of the electromagnetic radiation field, the period of time having a duration that is a function of a resistivity of said Group III–V matrix material.

47. A device as set forth in claim 40 wherein the body functions as an optical storage medium, and wherein the periodic spatial variation of the intensity of the electromagnetic radiation field encodes information.

48. A device as set forth in claim 40 and further comprising a first electrode means that is disposed upon a surface of said body and a second electrode means that is disposed upon a surface of said body, said first and second electrode means being electrically coupled during use to an electrical potential for establishing an electric field within said optically active heterogeneous region.

* * * * *